May 14, 1935. A. W. CAPS ET AL 2,001,596
CAMERA
Filed Dec. 21, 1931 15 Sheets-Sheet 2

INVENTORS
Arthur W. Caps
Paul Landrock
BY Edward H. Cumpston
Their ATTORNEY

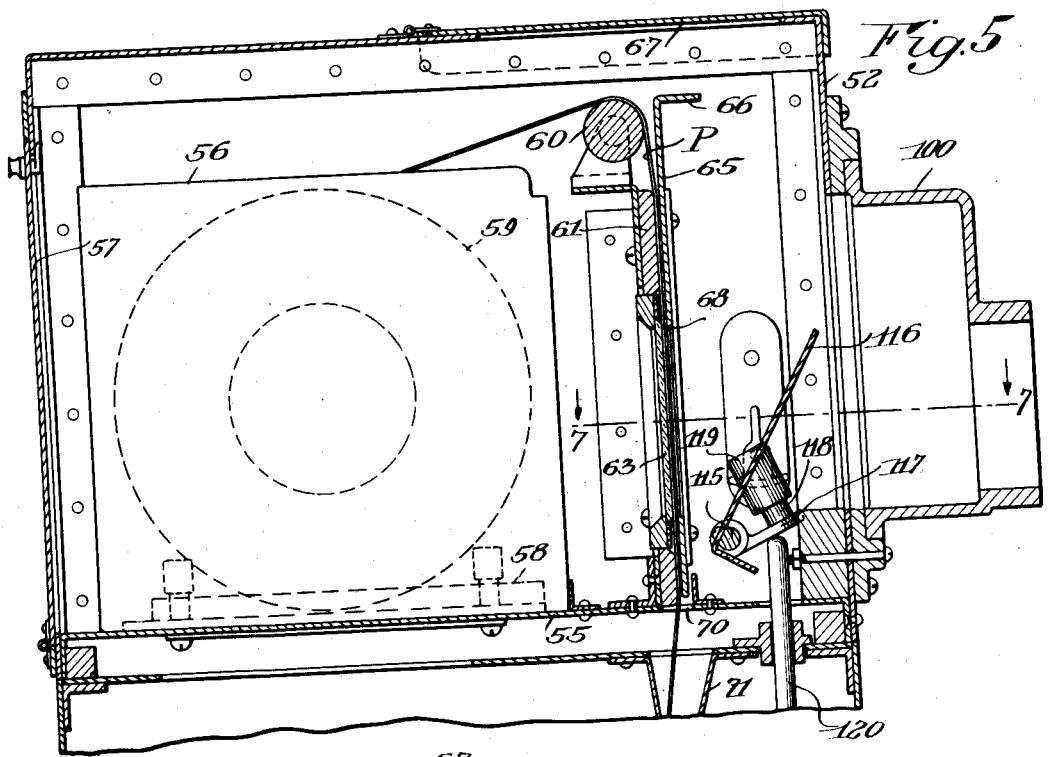
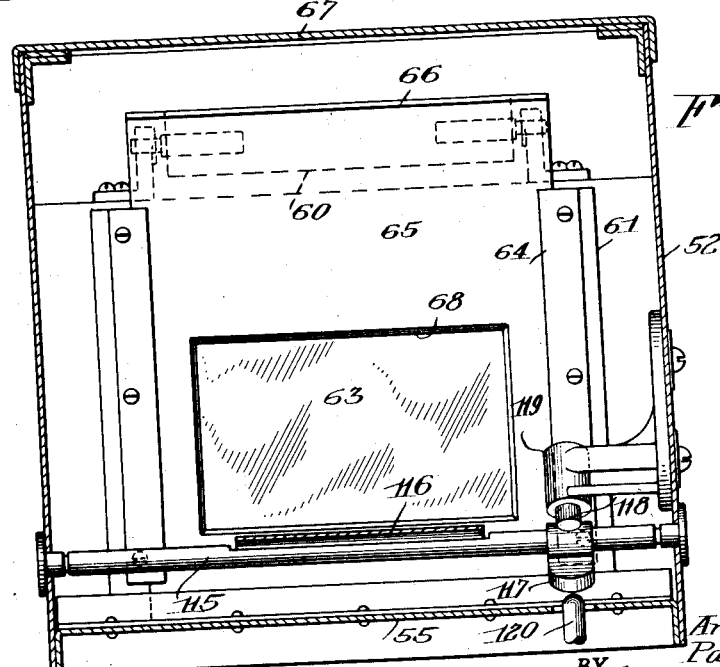

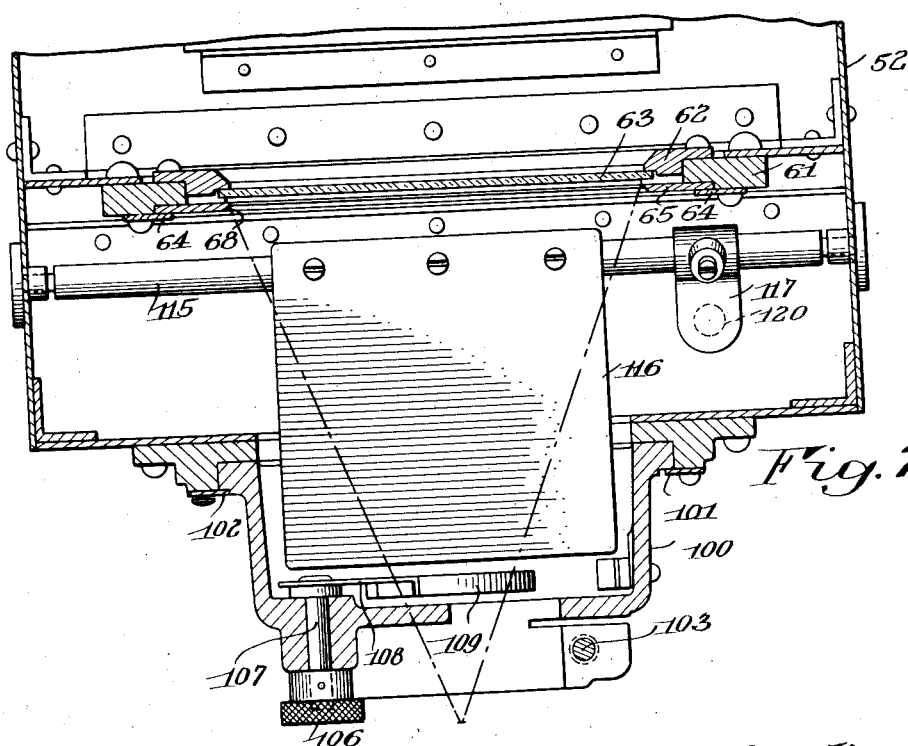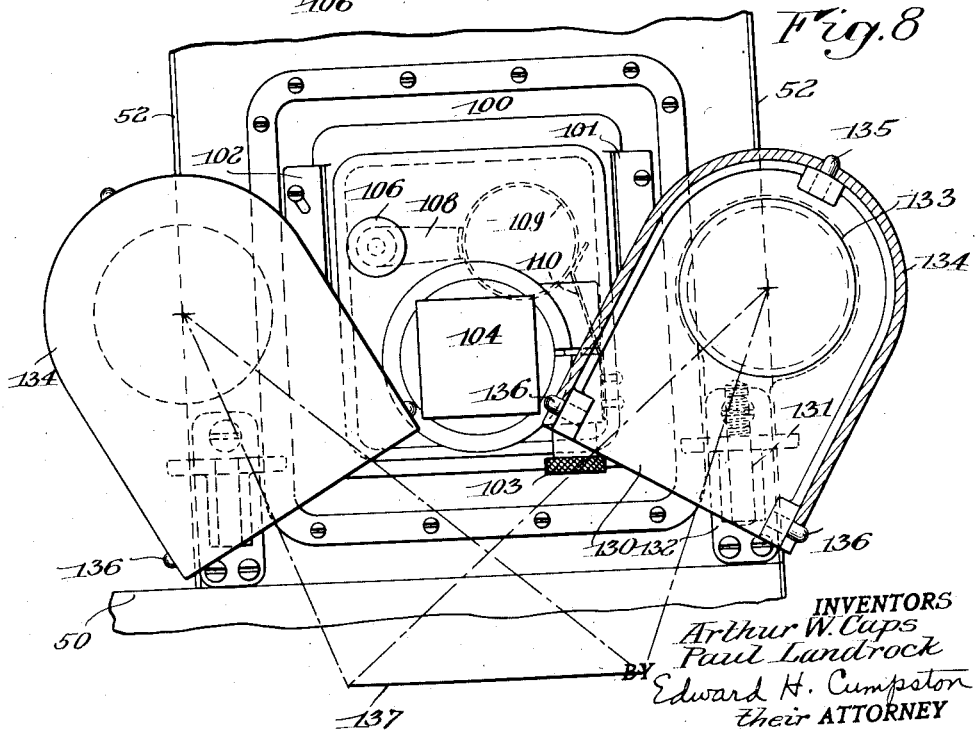

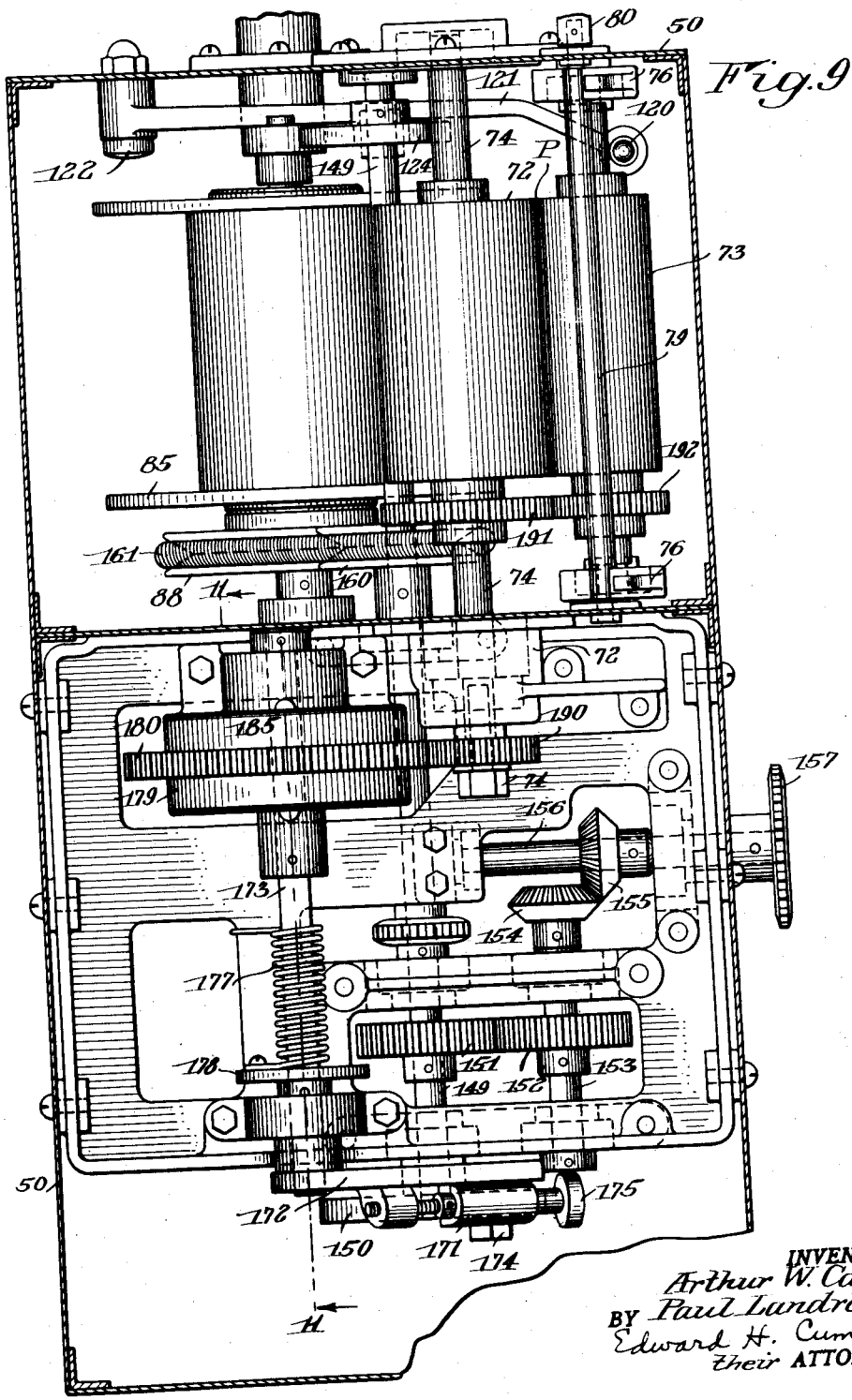

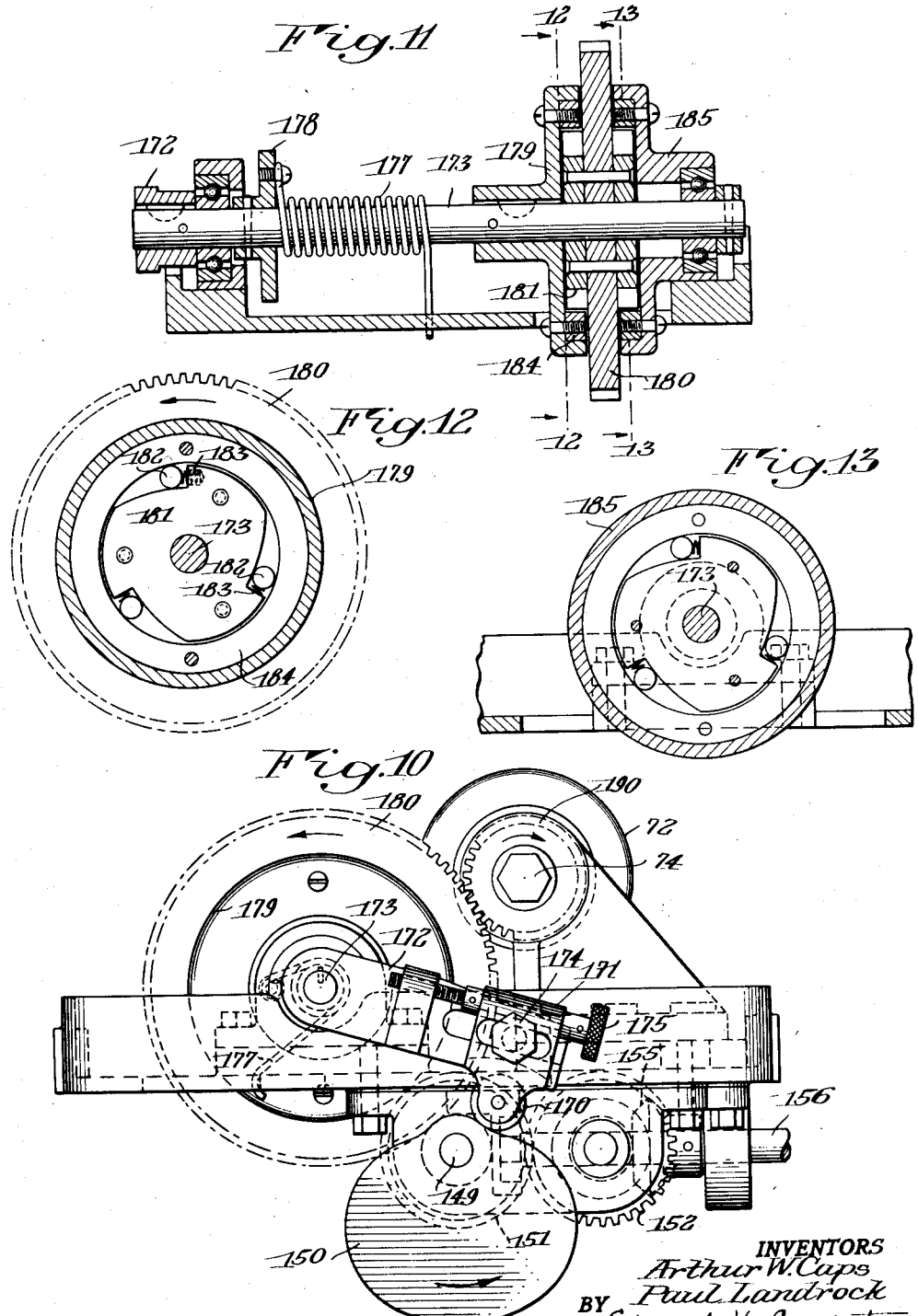

May 14, 1935.  A. W. CAPS ET AL  2,001,596
CAMERA
Filed Dec. 21, 1931  15 Sheets-Sheet 9
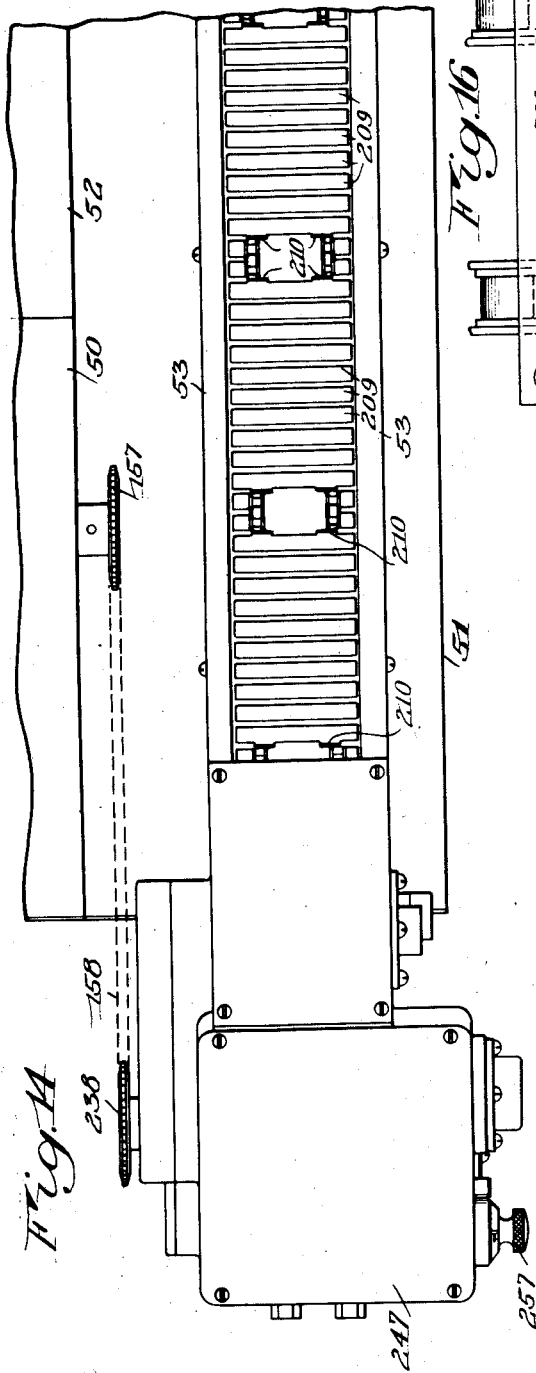
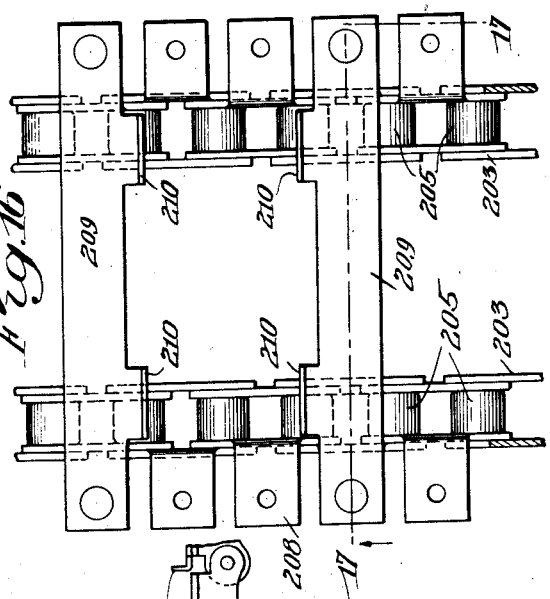
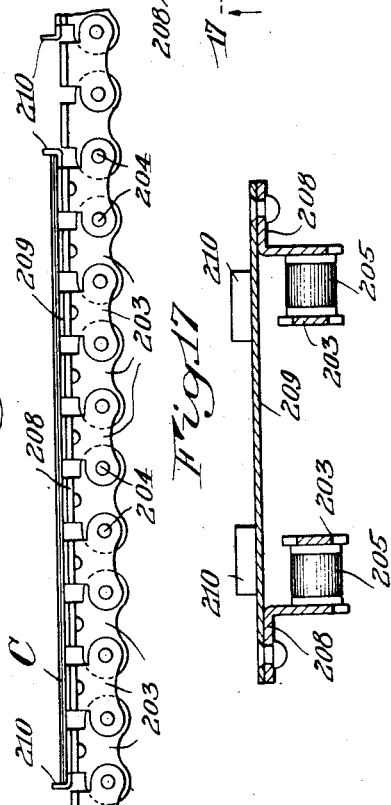
INVENTORS
Arthur W. Caps
Paul Landrock
BY Edward H. Cumpston
their ATTORNEY May 14, 1935.  A. W. CAPS ET AL  2,001,596
CAMERA
Filed Dec. 21, 1931   15 Sheets-Sheet 10

INVENTORS
Arthur W. Caps
BY Paul Landrock
Edward H. Cumpston
Their ATTORNEY

May 14, 1935.　　A. W. CAPS ET AL　　2,001,596
CAMERA
Filed Dec. 21, 1931　　15 Sheets-Sheet 11
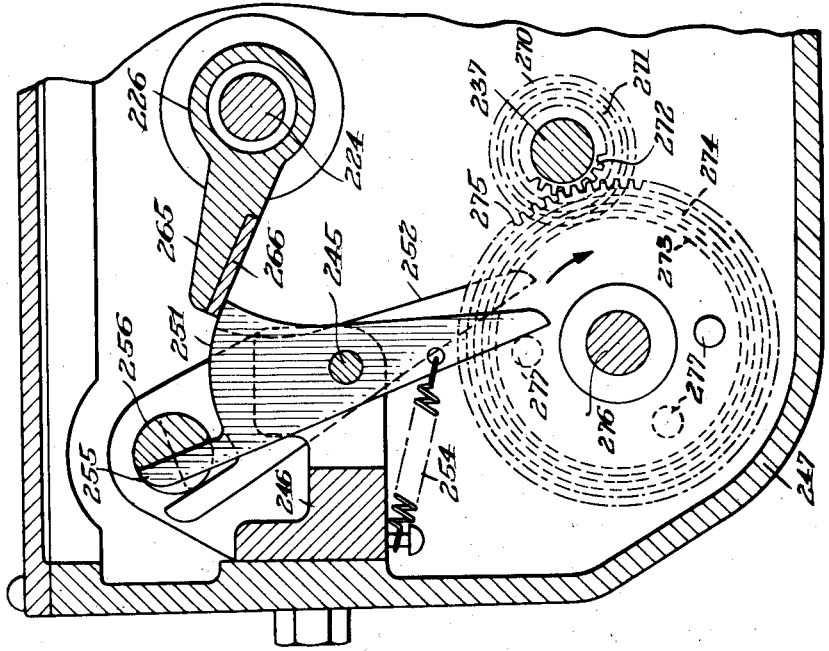
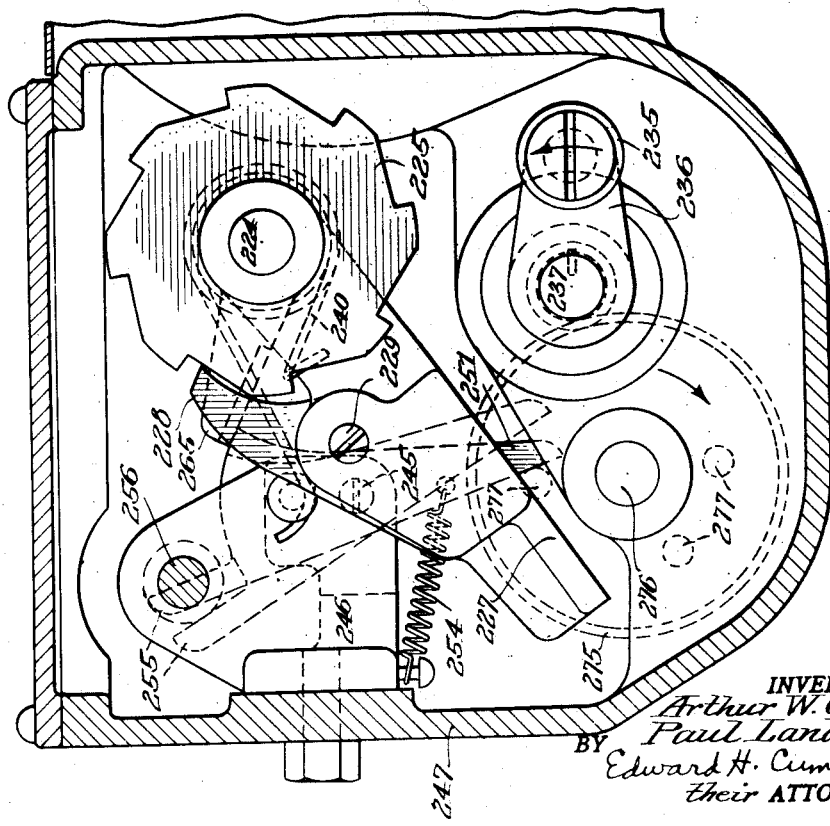
INVENTORS
Arthur W. Caps
Paul Landrock
BY Edward H. Cumpston
Their ATTORNEY May 14, 1935.    A. W. CAPS ET AL    2,001,596
CAMERA
Filed Dec. 21, 1931    15 Sheets-Sheet 12

INVENTORS
Arthur W. Caps
BY Paul Landrock
Edward H. Cumpston
their ATTORNEY

May 14, 1935.  A. W. CAPS ET AL  2,001,596
CAMERA
Filed Dec. 21, 1931  15 Sheets-Sheet 13
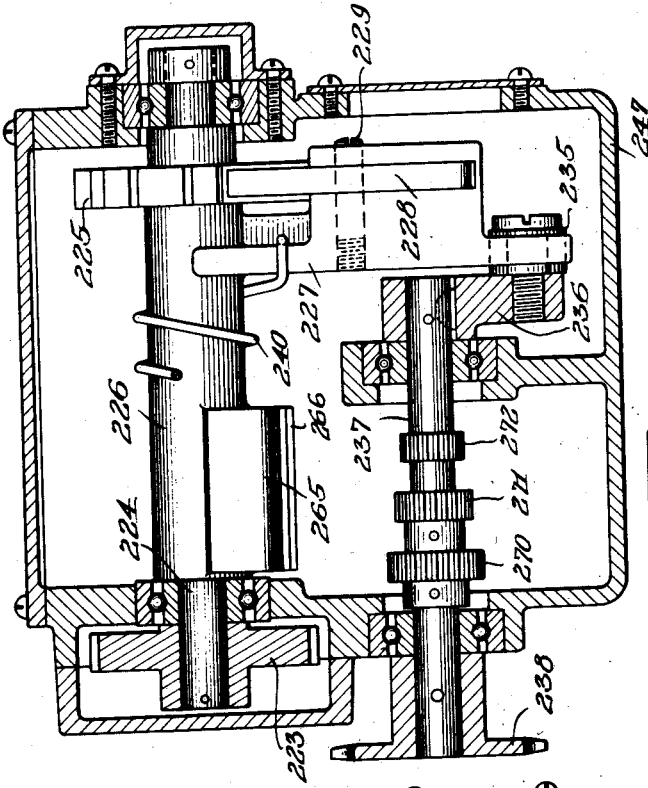
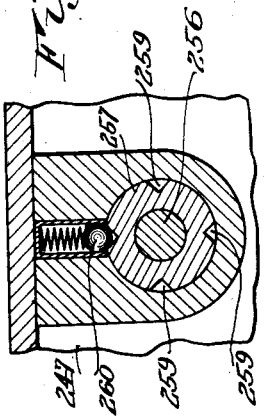
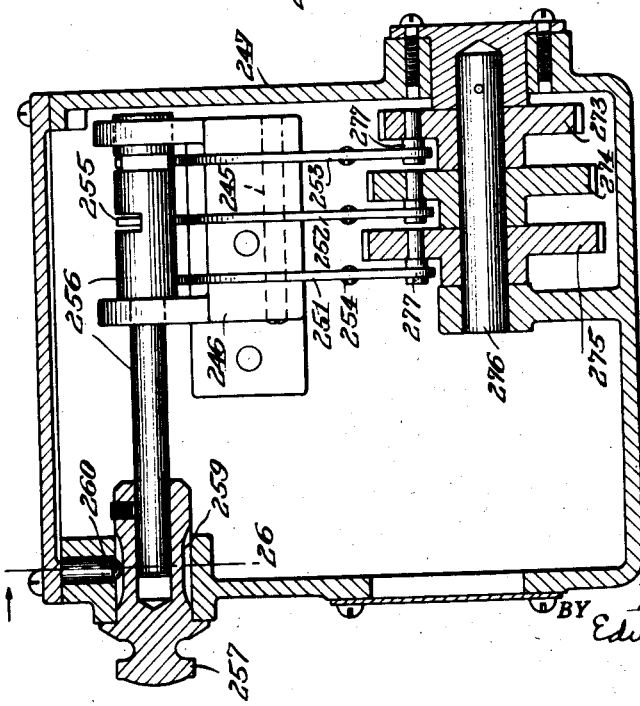
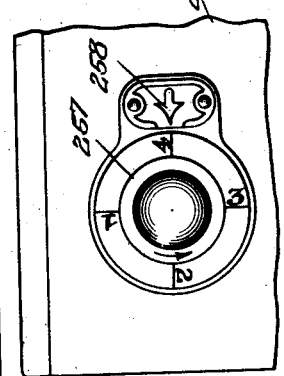
INVENTORS
Arthur W. Caps
Paul Landrock
BY Edward H. Cumpston
Their ATTORNEY

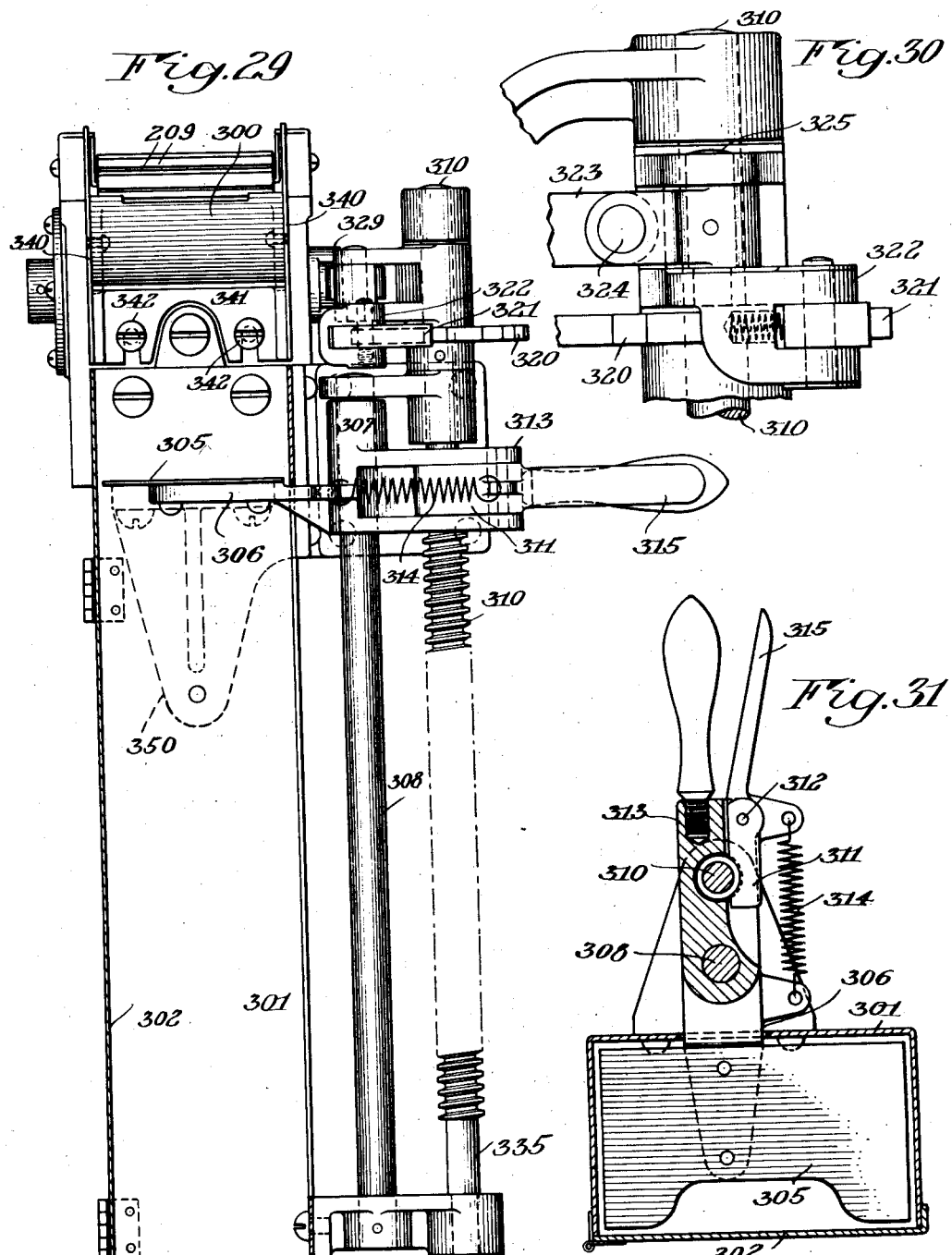

Patented May 14, 1935

2,001,596

UNITED STATES PATENT OFFICE 2,001,596

CAMERA

Arthur W. Caps and Paul Landrock, Rochester, N. Y., assignors to Photostat Corporation, Providence, R. I., a corporation of Rhode Island Application December 21, 1931, Serial No. 582,361

10 Claims. (Cl. 88—24)

This invention relates to a camera, and more particularly to an automatic camera so designed that it will take exposures of successive articles to be photographed, position the articles for exposure, remove them after exposure, and replace the exposed sensitized material by fresh unexposed sensitized material, all automatically and without attention of the operator otherwise than to feed the articles to be exposed to the machine.

An object of the invention is the provision of such a machine which is light, compact, simple to operate, and which is generally improved and more satisfactory than other machines heretofore known.

Another object of the invention is the provision of a machine especially designed and adapted for the rapid reproduction of relatively small forms such as cards and the like.

Still another object is the provision of a machine which will automatically make either one or a plurality of exposures of each article to be photographed, as may be desired.

A further object is the provision of simple and improved means for stacking the cards or other photographed articles after they have been photographed.

A still further object of the invention is the provision of various simplified and improved details of construction, many of which are applicable to various cameras of other types.

To these and other ends the invention resides in certain improvements and combinations of parts, all as will be hereinafter more fully described, the novel features being pointed out in the claims at the end of the specification.

In the drawings:

Fig. 5 is a vertical sectional view through a part of the camera illustrating the shutter and the focal plane support;

Fig. 6 is a vertical section taken substantially on the line 6—6 of Fig. 4;

Fig. 7 is a horizontal section taken substantially on the line 7—7 of Fig. 5;

Fig. 8 is a fragmentary front elevation of part of the camera with one of the lamp housings shown in vertical section;

Fig. 9 is a plan of part of the driving mechanism, with the casing illustrated in horizontal section;

Fig. 10 is an end view of part of the mechanism shown in Fig. 9, viewed from the left hand end of the machine which corresponds to the bottom of the sheet containing Fig. 9;

Fig. 11 is a vertical section substantially on the line 11—11 of Fig. 9;

Fig. 12 is a vertical sectional view taken substantially on the line 12—12 of Fig. 11, showing details of a driving clutch;

Fig. 13 is a vertical sectional view taken substantially on the line 13—13 of Fig. 11, showing details of a holding clutch;

Fig. 14 is a plan of a part of the machine illustrating especially the copy conveyor;

Fig. 15 is an elevation of a portion of the conveyor by itself, removed from its casing;

Fig. 16 is a plan of a portion of the conveyor on a larger scale;

Fig. 17 is a vertical transverse section through the conveyor substantially on the line 17—17 of Fig. 16;

Fig. 19 is a view similar to a portion of Fig. 18 showing the parts in a different position;

Fig. 20 is a vertical section taken substantially on the line 20—20 of Fig. 21, illustrating part of the mechanism shown in Fig. 19, with the parts in the same position as in Fig. 19;

Fig. 23 is a sectional view taken substantially on the line 23—23 of Fig. 18;

Fig. 24 is a sectional view taken substantially on the line 24—24 of Fig. 18;

Fig. 25 is a front elevation of the means for controlling the number of exposures to be taken of each article;

Fig. 26 is a vertical section through a portion of this controlling means, taken substantially on the line 26—26 of Fig. 23;

Fig. 29 is an end elevation of the parts shown in Fig. 27 viewed from the right hand end of the machine, with part of the casing in vertical section;

Fig. 30 is a fragmentary elevation of part of the mechanism shown in Figs. 27 to 29 inclusive illustrating details on a larger scale, and Fig. 31 is a horizontal section through the means for supporting a stack of discharged photographed articles.

Similar reference numerals throughout the several views indicate the same parts.

Figure 1:
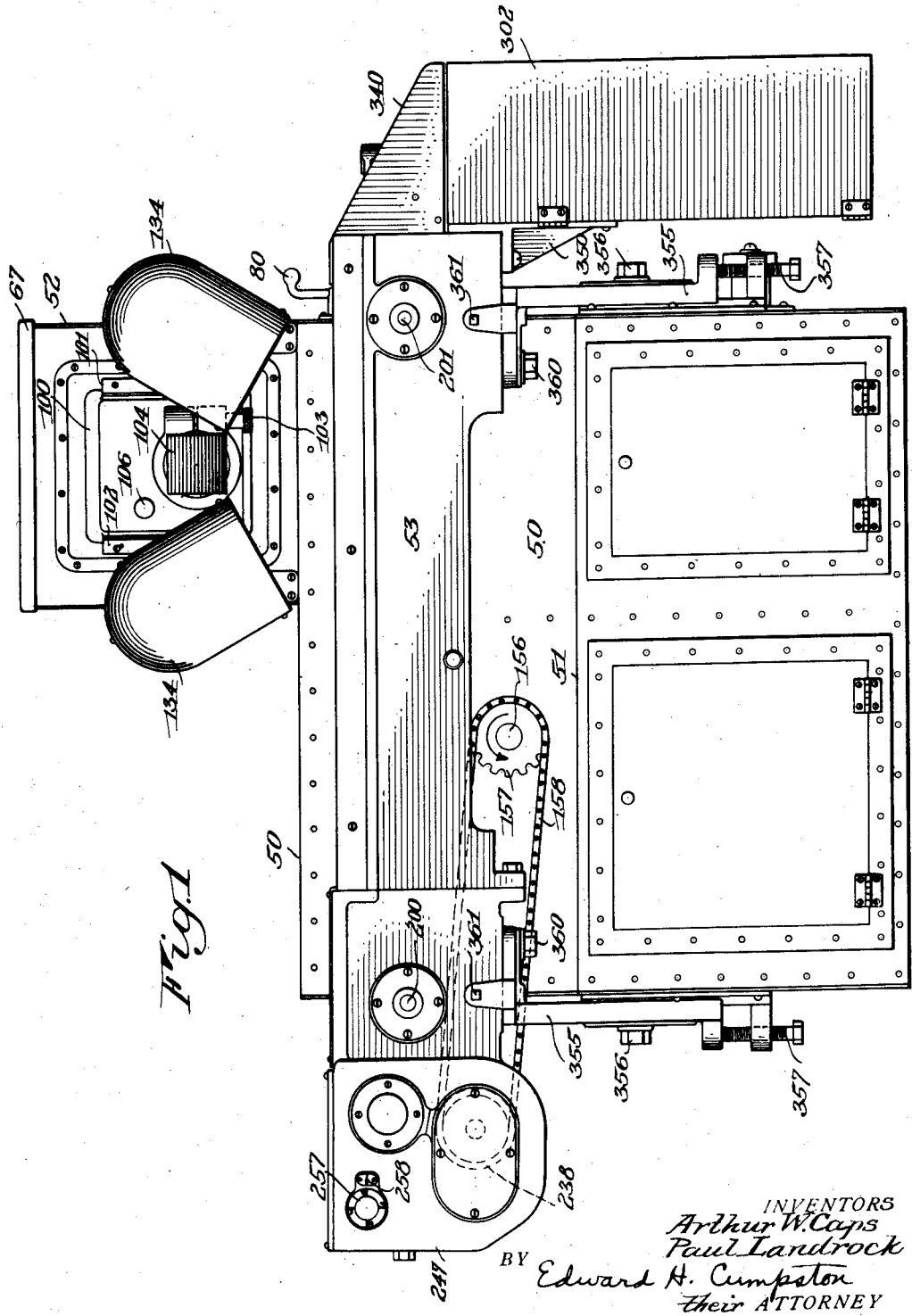
Fig. 1 is a front elevation of a machine constructed in accordance with a preferred embodiment of the invention.

Referring now to Figs. 1 to 4 inclusive, the machine comprises a main body or casing 50 having near its bottom a forward extension 51 running substantially the whole length of the casing, and an upward extension 52 near the right hand end of the main casing 50.

The focal plane support, the supply of sensitized material, the shutter, and the lens are mounted either in or upon the casing portion 52, which may be said to constitute the camera proper. The driving mechanism for the camera is located primarily within the main casing portion 50 and the forward extension 51. Above this extension 51 and mounted thereon is a casing 53 containing a copy conveyor for automatically moving the articles to be photographed into the photographic field of the camera, bringing them to rest in this field while one or more exposures are made, and then removing them from the field.

It will be most convenient to describe first the parts of the camera proper. Referring now especially to Fig. 5 of the drawings, the portion 52 of the casing is provided with a horizontal partition 55 serving as a floor for supporting a roll box 56 insertable in and removable from the casing through a rear door 57. The roll box 56 is guided laterally by suitable guide means, such as the angle irons 58, and it carries a roll 59 of sensitized photographic material such as paper, which may be led from the roll 59 over a guide roller 60 and thence downwardly over a focal plane support, the strip of sensitized material at this point being indicated by the letter P.

The focal plane support, best shown in Figs. 5 to 7 inclusive, comprises a vertical frame member 61 having a large central aperture therein, to which frame member 61 is secured a supplementary frame member 62 serving to hold a ground glass plate 63 in predetermined vertical position within the aperture of the frame 61. The sensitized material P passes downwardly over the front of the frame 61 and of the ground glass plate 63. When the sensitized material and the roll box are removed from the camera and the rear door 57 is opened, the camera may be focused by observing the image on the ground glass plate 63.

The frame 61 on its front side is provided with rabbets and with plates 64, which together form guideways in which a masking and retaining plate 65 is vertically slidable. This plate has a bent over flange 66 at its top which may be conveniently grasped when a top door 67 of the casing is opened, so that the plate 65 may be removed from its guideways by a vertical upward movement or replaced in its guideways by a vertical downward movement. When in position in its guideways, the plate 65 serves to retain the sensitized material P accurately and smoothly against the focal plane support 63, thus maintaining it accurately in the focal plane.

The plate 65 is provided with an aperture 68 defining the exposure area of the sensitized material and determining the size of the exposure made thereon, the rest of the material being masked off by the plate 65 which is preferably of metal or other opaque material. Thus the plate 65 prevents stray light from affecting any part of the sensitized material, except that part which it is desired to expose.

After passing over the focal plane support the sensitized material continues downwardly through an aperture 70 in the partition 55 and through a short chute 71 and between two feeding rolls 72 and 73, the former fixed to a shaft 74 rotatable in bearings fixed in the casing, while the latter is mounted on a shaft 75, the ends of which are rotatably mounted in a pair of upstanding arms 76 pivoted at 77 at their lower ends and urged rearwardly by springs 78 so that the roller 73 normally tends to hold the sensitized material firmly against the roller 72. The upper ends of the arm 76 engage in notches in a cross shaft 79 which may be oscillated from outside the casing by a handle 80 (Fig. 2) so that the arms 76 are cammed forwardly to separate the roller 73 from roller 72 and allow sensitized material to be inserted between the rollers.

Figure 2:
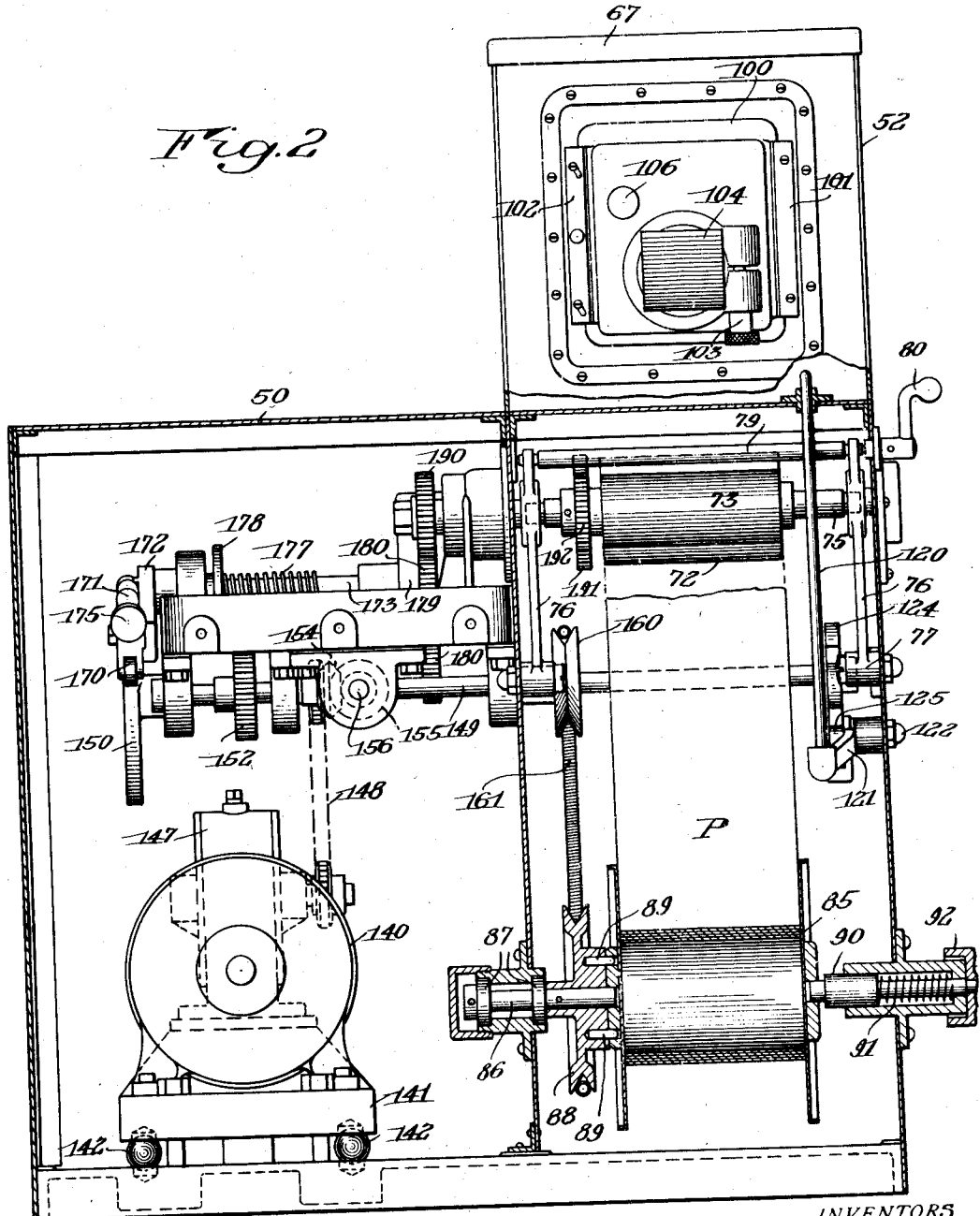
Fig. 2 is a vertical section through part of the machine, with parts in elevation, looking at the machine from the same direction as Fig. 1.

Passing on downwardly beyond the feeding rollers, the exposed sensitized material is wound up on a rewinding reel 85 mounted in the manner best shown in Fig. 2. A shaft 86 is mounted in ball bearings 87 and carries a pulley 88 having pins 89 projecting from the side thereof. These pins engage in corresponding recesses in one end of the rewinding reel 85 so that motion transmitted to the pulley 88 as hereafter described will be imparted to the reel 85 and will cause the sensitized material to be wound up on this reel. The opposite end of the rewinding reel is held on a shaft 90 inwardly urged by a spring 91 into a central aperture in the rewinding reel, but which may be pulled rightwardly to release the rewinding reel by grasping the external handle 92. When a reel 85 becomes filled with exposed sensitized material, it may be removed from the machine through a suitable door in the casing and an empty reel may be substituted for accumulating further exposed material.

Figure 4:
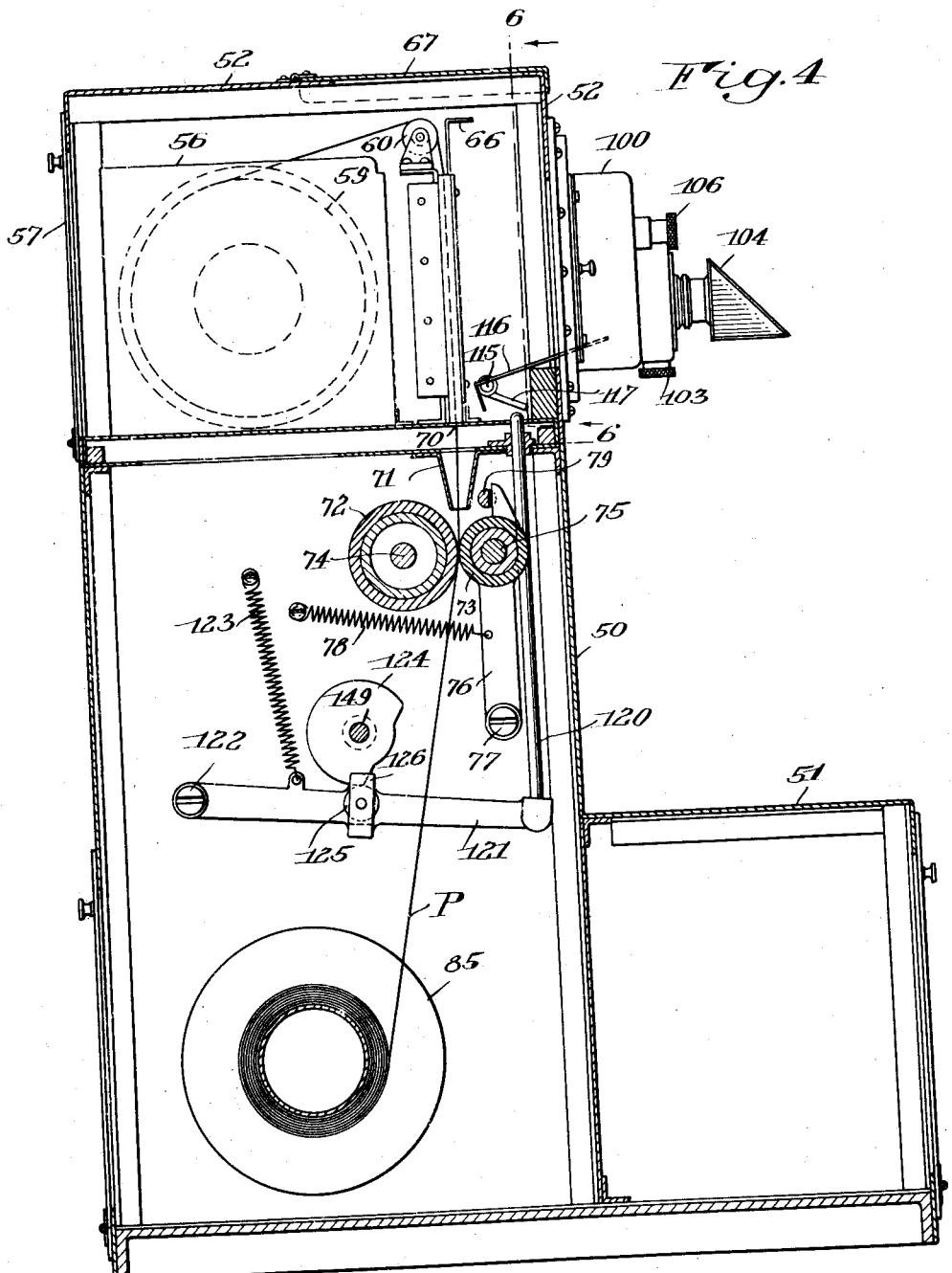
Fig. 4 is a transverse vertical view somewhat similar to Fig. 3 taken on a plane farther to the right than the plane of Fig. 3, and with parts omitted.

The camera front, best illustrated in Figs. 2, 4, and 7, comprises a casing 100 seated in a suitable socket in the front of the camera casing 52 and held therein by a fixed overlying holding plate 101 at the right hand side and a movable overlying holding plate 102 at the left hand side. The plate 102 is held in place by screws passing through oblique slots, as best shown in Fig. 2, so that by lifting upwardly on the plate 102, it will at the same time move outwardly and release the left hand edge of the casing 101, so that this casing may be readily detached.

At the front of the casing 101 is a split ring and clamping screw 103 for detachably holding a suitable lens and prism unit 104, the prism being provided as is usual in commercial cameras for bending light rays through substantially a right angle, so that articles to be photographed may be laid in substantially horizontal position beneath the prism and the light rays passing upwardly therefrom will be bent to pass through the lens and into the camera.

On the front of the casing 100 is a knob 106 fixed to the front end of the shaft 107 which carries at its rear end an arm 108 (Figs. 7 and 8)

supporting a color filter 109 which may be held in elevated ineffective position by a leaf spring 110. By oscillating the knob 106 in one direction or the other, the color filter 109 can be oscillated downwardly into an effective position in the optical axis of the camera, or moved upwardly to the position shown in Fig. 8 in which the rays of light do not pass through it.

The shutter of the camera, best shown in Figs. 4 to 7 inclusive, is of the flap type, and comprises a cross shaft 115 rotatably mounted in the casing, to which is secured the flap 116 preferably of light material, such as aluminum. The shaft 115 also carries an arm 117 which is arranged to contact with a limiting stop 118 of slightly resilient material, such as felt or rubber held in a bracket 119 secured to the wall of the casing 52, to limit the oscillation of the shaft 115 in a counter-clockwise direction when viewed as in Fig. 5. This arm 117 serves also as an operating arm, being engaged on its lower side by the operating plunger or rod 120, the lower end of which, as shown in Fig. 4, is operatively connected to the forward end of an arm 121, the rear end of which is pivoted at 122 to the side of the main casing 50. A spring 123 urges the arm 121 upwardly to lift the plunger 120 to oscillate the shaft 115 to move the shutter flap 116 to the closed position illustrated in Fig. 5. A cam 124, however, best shown in Fig. 4, and operated as hereafter described, is effective upon a follower roller 125 on the arm 121 to depress this arm and the plunger 120 and thus to allow the shutter flap 116 to drop by gravity from the closed position shown in Fig. 5 to the open position shown in Figs. 4 and 7. The arm 121 has upward extensions 126 at each side of the follower roller 125 which lie on each side of the cam 124 and thus limit lateral play of the arm 121.

For illuminating the articles to be copied suitable illuminating means is provided, as best shown in Figs. 1 and 8. At the front of the machine are a pair of brackets 130 each in the form of a substantially vertical plate having a rounded top and each having secured thereto a pin 131 adapted to fit loosely into a receiving socket 132 on the front of the camera casing 52. Each of these brackets 130 carries a socket for receiving an electric light bulb 133. Over each bulb is placed a quickly removable protecting and reflecting casing 134 enveloping the bulb 133 at the top and front, but being open at the bottom so that light may issue through the bottom opening. Each bracket 130 is provided with an upper pin 135 passing through a hole near the top of the casing 134, and with a pair of lower pins 136 received in slots at the bottom of casing 134, so that merely by lifting the casing upwardly it may be disengaged and removed from the bracket 130 to permit access to the bulb 133 for replacement thereof. Similarly, after the bulb has been replaced, the casing 134 may be readily attached again simply by lowering it so that the pins 135 and 136 may be received in their respective hole and slots. The axis of each reflecting and protecting casing 134 is slightly inclined as illustrated in the drawings so that the light furnished by the illuminating units will be directed upon the article to be photographed, diagrammatically illustrated at 137 in Fig. 8.

The driving mechanism for the parts so far described will now be explained, first referring to Figs. 2 and 3. A suitable source of power, preferably an electric motor 140, is mounted near the front end of a bed plate 141, which is preferably of somewhat triangular shape in plan, having a three point support so that it may be readily adjusted and alined. The front or wide end of the bed plate 141 is supported on two balls 142 and held down in contact with them by bolts 143, while the rear or narrow end of the bed plate is supported by the stud 144 and may be adjusted upwardly or downwardly by shifting the nuts 145 and 146.

Figure 3:
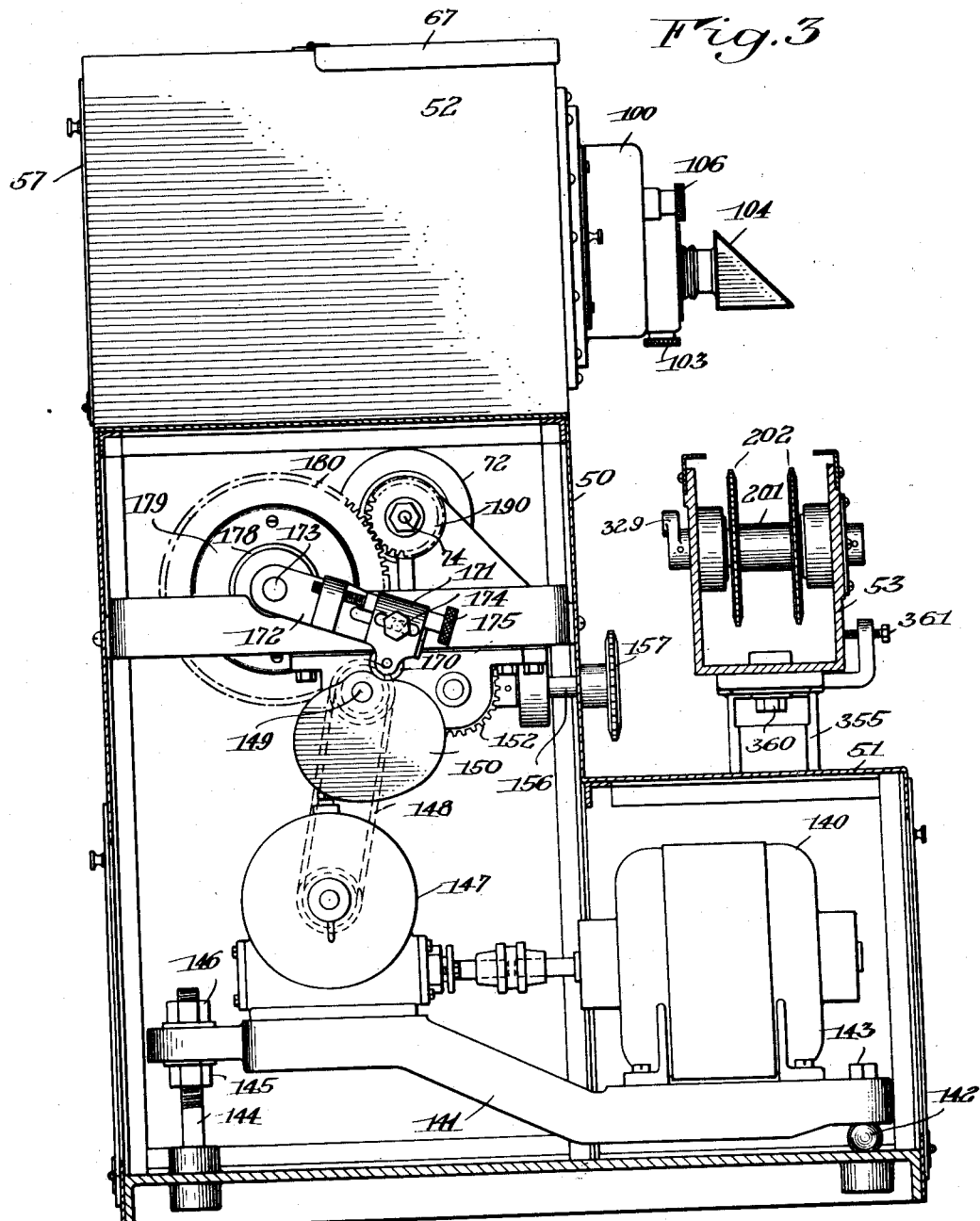
Fig. 3 is a transverse vertical section taken on a plane near the left hand end of the machine looking toward the right hand end.

On this bed plate near the rear end thereof is mounted a worm reduction gear unit 147 driven directly from the motor 140, as shown in Fig. 3, while this reduction gear 147 drives through a chain 148 or other suitable drive, a shaft 149.

At its left hand end this shaft 149 carries a feeding cam 150, the operation of which will be hereafter described. The shaft also carries a spur gear 151, best seen in Fig. 9, meshing with another spur gear 152 on a shaft 153 carrying a bevel gear 154 driving another bevel gear 155 on a shaft 156 at right angles to the shafts 149 and 153. The shaft 156 thus driven from the shaft 149 carries a sprocket 157 over which runs a chain 158. Fig. 1, for driving the conveying mechanism which will be hereafter described.

The shaft 149 also carries a pulley 160 (Figs. 2 and 9) in substantially the same plane as the pulley 88 of the rewinding reel 85. A suitable friction drive, such as the coiled spring belt 161, passes over the pulleys 160 and 88, so that rotation of the pulley 160 tends to be transmitted to the rewinding pulley 88, but the coiled spring 161 may easily slip over the pulleys whenever the sensitized material is stationary and impedes the rotation of the rewinding reel 85.

The feeding of the sensitized material after each exposure is controlled by the cam 150 above mentioned. Referring now to Figs. 3 and 10, it will be seen that this cam 150 acts upon a follower roll 170 mounted on a block 171 adjustable radially along an arm 172 fixed to a shaft 173. A lag screw 174 threaded into the arm 172 passes through a slot in the block 171 so that when the screw is loosened the block may be adjusted radially along the arm 172 toward and away from the shaft 173 and when the screw 174 is tightened the block 171 will be held in adjusted position. An adjusting screw 175 is provided for accurately adjusting the block 171 along the arm.

By this arrangement, the effective distance of the follower roller 170 from the axis of the shaft 173 can be adjusted through a limited range and thus the extent of oscillation of the shaft 173 at each actuation by the cam 150 can be varied slightly, in order to adjust accurately the amount of feeding imparted to the sensitized material at each cycle of operation.

As best shown in Figs. 9 and 11, the shaft 173 is provided with a spring 177 coiled around the shaft, one end of the spring being fixed to a collar 178 on the shaft and the other end of the spring engaging a stationary part of the frame work, so that the spring tends to rotate the shaft in a clockwise direction when viewed as in Figs. 3 and 10, and thus holds the follower roller 170 downwardly in engagement with the cam 150, but nevertheless permits the shaft 173 to be oscillated in a counter-clockwise direction by the action of the cam upon the follower roller. This counter-clockwise oscillation is transmitted through a one way driving clutch 179 (Figs. 11 and 12) to the gear 180 rotatably mounted on the shaft 173. The clutch is of any suitable one-way driving construction, comprising, for example, a hub member 181 fixed to the gear 180 which is to be driven, and having a plurality of rollers 182 mounted in tapered notches and pressed by springs 183 so as to engage the internal face of a ring 184 fixed in the housing of the clutch 179. Thus any counter-clockwise rotation of the ring 184 which is fixed to rotate with the shaft 173 is transmitted to the hub 181 and causes corresponding counter-clockwise rotation of the gear 180, but when the shaft 173 returns in a clockwise direction under the influence of the spring 177, then the rollers 182 will simply move slightly against the action of their springs 183 so that the clutch slips without causing corresponding movement of the gear 180.

To prevent any accidental retrograde movement of the gear 180 it is provided with a second clutch 185 similar in construction to the clutch 179, but the casing of which is non-rotatably secured to the frame work of the mechanism. By means of similar spring pressed rollers in known manner the clutch 185 will permit the gear 180 to move in a counter-clockwise direction under the influence of the shaft 173, but will positively hold it against accidental reverse movement.

Through the mechanism above described, each rotation of the shaft 149 and its feeding cam 150 results in a single oscillation of the shaft 173, first in a counterclockwise direction as the follower roller 170 moves up from the low point to the high point of the cam, and then in a clockwise direction as the follower roller moves down from the high point to the low point. This oscillation of the shaft 173 is thus translated into an intermittent unidirectional movement of the gear 180, which moves in a counter-clockwise direction when the shaft is moving in that direction, and which remains stationary when the shaft moves in a reverse direction.

The gear 180, as best shown in Figs. 3 and 9, meshes with a gear 190 on the shaft 74 which carries the feeding roller 72. The shaft 74 in turn carries a spur gear 191 (Fig. 9) meshing with a spur gear 192 on the shaft 75 of the other feeding roller 73. The gears 191 and 192 are of the same proportion relative to each other as the diameters of the feeding rollers 72 and 73, so that these two rollers will always rotate in synchronism. The gears 180 and 190 are so proportioned relative to each other that each intermittent movement of the gear 180 will be sufficient to rotate the gear 190 enough to move the feed rollers to a sufficient extent so that the exposed portion of sensitized material is completely moved out of the exposure area and a fresh unexposed portion is drawn into the exposure area of the focal plane. As before stated, the extent of feeding can be minutely adjusted by moving the block 171 on which the follower roller 170 is mounted.

The cam 124 for operating the shutter of the camera is likewise mounted on the shaft 149 above mentioned, on which the feeding cam 150 is mounted. These two cams are so placed relative to each other on the shaft 149, that the feeding of the sensitized material will take place only when the shutter is closed, and the shutter will open only when the feed rollers are at rest so that a fresh supply of sensitized material is held stationary in the focal plane.

As previously stated, the present machine is provided with conveyor means within the casing 53 for automatically positioning articles to be photographed in proper position in the photographic field of the camera. This conveying mechanism will now be described referring first to Figs. 3, 14 to 18 inclusive, and 28. Near each end of the conveyor casing 53 is a cross shaft, the one near the left hand end being designated by the numeral 200 and the one near the right hand end being numbered 201. Each shaft carries a pair of sprockets 202, all of which may be identical in construction. Over these sprockets run a pair of conveyor chains, each made up of individual links 203 pivoted to each other by pivot pins 204. The pivot pins of the links preferably are surrounded by rollers 205. Along the upper stretch or reach of the conveyor, the links slide upon supporting plates 206 so that the upper reach of the conveyor is held perfectly level and in alinement, since it is this reach of the conveyor which holds the articles to be copied while they are being photographed. Each link 203 is provided with a bent over ear or lug 208 extending outwardly substantially horizontally from the links, as shown in Figs. 16 and 17. Cross members or slats 209 extend across the conveyor from one chain to the other and are secured at opposite ends to the ears 208 of the two chains, in any suitable manner, such as by riveting. These slats 209, preferably of metal, form the bed or copy receiving surface on which the articles to be photographed are placed.

The present machine is intended to reproduce photographically a number of articles preferably of the same size, such as a series of record cards, index cards, or the like. Means is therefore preferably provided for guiding or positioning the individual cards or other articles relative to the conveyor so that they will be accurately centered in the photographic field of the camera when the exposure is being made. This means, in the present instance, may comprise lugs 210 bent upwardly from certain of the slats 209 so that they stand above the plane of the slats and form stops or guides against which the articles to be copied may be positioned. When all of the articles are of the same size, such as cards of predetermined dimensions, the lugs 210 may be placed at intervals corresponding to one of the dimensions of the articles. In the specific embodiment illustrated in the drawings, the width of the conveyor is approximately equal to the height of an index card of a certain standard size, while the distance from the pair of lugs on one slat to the next cooperating pair of lugs on another slat is substantially equal to the length of the card, so that the card will fit snugly between the lugs and thus be properly alined and centered on the conveyor. Such a card is indicated at C in Fig. 15.

Preferably there is a slight space between the lugs cooperating with one end of one card and the lugs cooperating with the adjacent end of the next card. For example, as shown in Figs. 14 and 15, the lugs cooperating with the right hand end of the card C are on one link, while the lugs for positioning the adjacent or left hand end of the next card to the right are on the third link beyond the one just mentioned. The intervening two slats are preferably entirely omitted from the conveyor, not only making the conveyor lighter than if they were affixed to the chains, but also providing a space or opening for easy access to certain of the pins holding the links of the chains together, so that the pins can be removed more readily when necessary for replacement or repairs.

The mechanism for driving the conveyor will now be described, referring first to Fig. 18 of the drawings. The shaft 200 near the left hand end of the conveyor is provided with a gear 220 meshing with a larger gear 221 which, in turn, is fixed to a small gear 222 meshing with a larger gear 223. In this way a relatively slight movement of the gear 223 will rotate the shaft 200 to a considerable extent sufficient to carry an exposed article out of the photographic field of the camera and bring a fresh article to be photographed into the photographic field.

The gear 223 is fixed to a shaft 224 (Figs. 18 and 24) which also has fixed thereto a ratchet 225. Rotatably mounted on the shaft 224 is a sleeve 226 having a substantially radial arm 227 to which is secured a pawl 228 pivoted at 229 and urged by a spring 230 into engagement with the ratchet 225. Oscillation of the arm 227 in a clockwise direction, when viewed as in Fig. 18, will therefore result in corresponding clockwise movement of the ratchet 225 and gear 223 and, through the train of gearing previously described, will cause clockwise rotation of the shaft 200 and movement of the copy conveyor in a rightward direction when viewed from the front of the machine as in Figs. 1 and 18. Reverse oscillation of the arm 227 in a leftward direction, however, will not result in any movement of the conveyor, since the pawl 228 will simply slip over the ratchet 225.

For oscillating the arm 227 which carries the pawl 228, there is provided a roller 235 on a crank 236 (see Figs. 18, 22, and 24) which is fixed to a shaft 237 having at its rear end a sprocket 238 over which runs the driving chain 158, shown in Fig. 1 and previously mentioned. Through this chain 158, the constant counter-clockwise rotation of the sprocket 157 is transmitted to the sprocket 238 and this causes constant rotation of the crank 236 in a counter-clockwise direction, when viewed from the front of the machine as in Figs. 1 and 18. During each revolution of the crank the roller 235 thereon contacts with and rolls along the under or right hand side of the arm 227 and thus oscillates the arm in a clockwise direction from the position shown in Fig. 18. During this clockwise oscillation of the arm the pawl 228 thereon engages a tooth of the ratchet 225 to cause corresponding oscillation of this ratchet and of its shaft 224, as above described, so that the conveyor is driven rightwardly through a predetermined distance. Continued movement of the crank 236 permits the arm 227 to oscillate back to its initial position shown in Fig. 18, partly by gravity and partly under the influence of a spring 240 coiled around the sleeve 226, one end of the spring being suitably held at any fixed point and the other end engaging a portion of the arm 227. The parts are preferably so positioned and proportioned that the complete clockwise oscillation of the arm 227 will occur in about one-third of a revolution of the crank 236, and during the remaining two-thirds of the revolution the arm will be returning to its initial position or will remain stationary. Thus the driving of the conveyor will take place only during about one-third of a revolution or cycle of operation, and the camera shutter can remain open, if necessary, for nearly two-thirds of each cycle of operation.

From the foregoing description it is apparent that each revolution of the sprocket 228 and consequent rotation of the crank 236 will cause one complete oscillation of the arm 227 and will drive the ratchet 225 through a distance of one tooth, which will move the conveyor rightwardly through an amount equal to the spacing of the articles to be copied, so that one article which has been photographed will be removed from the photographic field of the camera and the next article will be placed in the field in the proper position to be photographed.

The machine is preferably timed so that the sprocket 238 makes one complete revolution each time that the shaft 149 makes one complete revolution, and the forward intermittent driving of the conveyor takes place, of course, while the shutter is closed and while the sensitized material is being fed. When the sensitized material is stationary and the shutter is opened to make an exposure, the copy conveyor is likewise stationary, since at this time the arm 227 is moving backwardly during the return stroke of its oscillation and the pawl 228 is passing over the ratchet teeth 225.

In this way, the conveyor is moved forwardly one step after each exposure, so that one photograph will be made of each article placed on the conveyor. In some instances, however, it may be desired to take more than one photograph of each article, and the present apparatus is so designed that one or several exposures of each article may be made, as desired.

The mechanism permitting the making of a plurality of exposures of each article may be termed for convenience the duplicating mechanism, and is illustrated in Figs. 18 to 26 inclusive. This duplicating mechanism operates to prevent forward movement of the conveyor at certain times, so that instead of moving the conveyor one step after each exposure, it will be moved only after each two exposures if two copies are to be made of each article, or only after each three exposures if three copies are to be made of each article, and so on. Obviously the mechanism can be designed to make any desired number of exposures of each article, and the present drawings illustrate an embodiment in which two, three, or four exposures of each article can be made automatically, as well as a single exposure.

Figure 18:
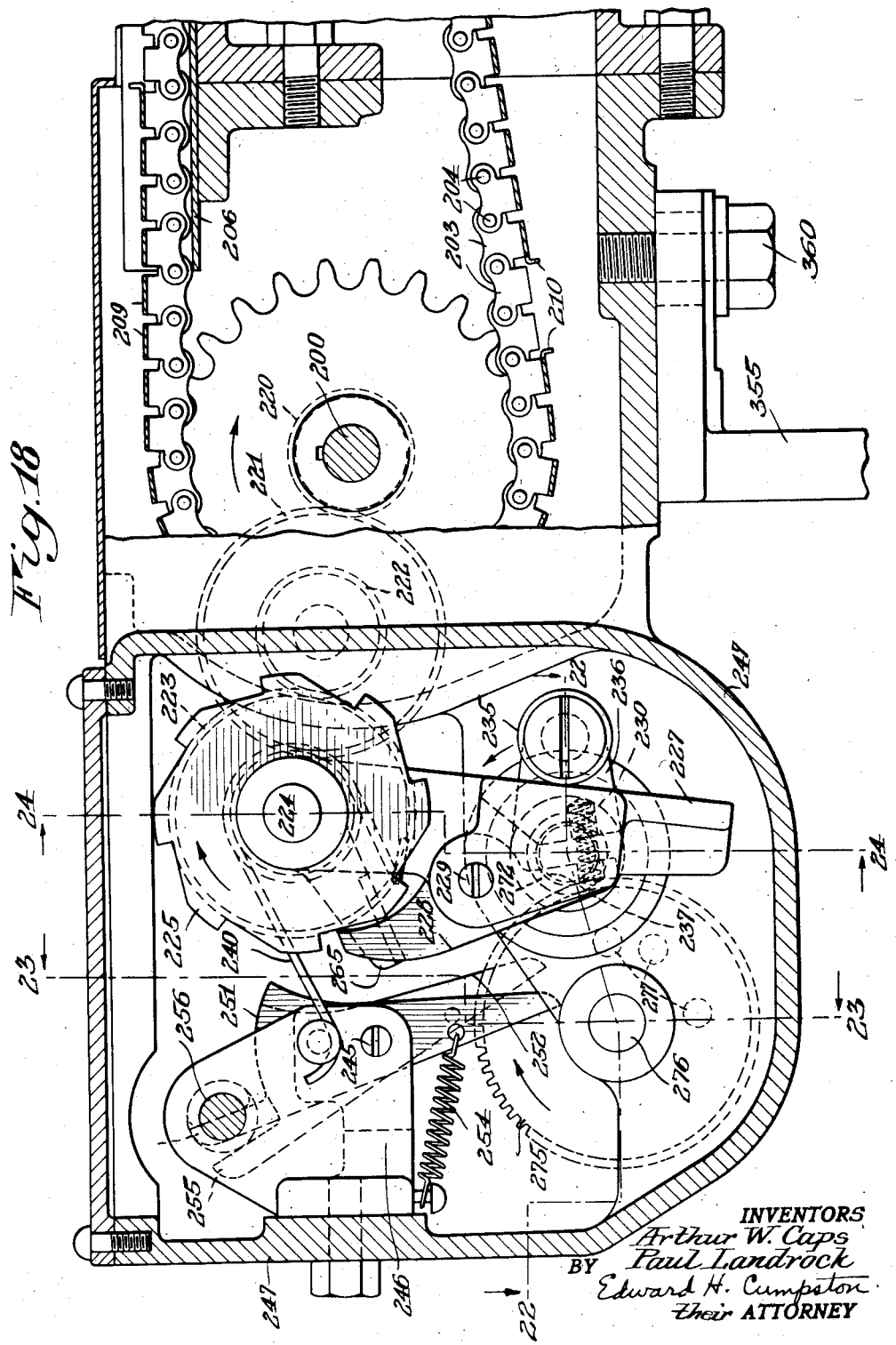
Fig. 18 is a vertical section through the left hand end of the conveyor illustrating the driving mechanism therefor.
Figure 21:
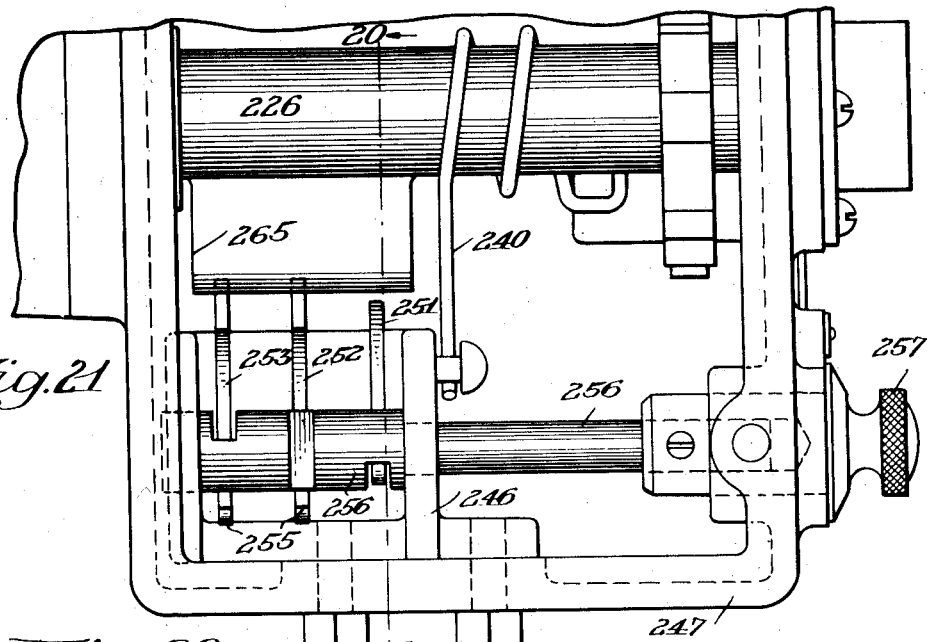
Fig. 21 is a plan of part of the mechanism illustrated in Figs. 18 to 20 inclusive.

Referring now especially to Figs. 18 and 20, a cross shaft 245 is held by a suitable bracket 246 secured to the casing 247, which envelops the drive mechanism for the conveyor. On this shaft are pivotally mounted a plurality of latching levers, three being shown in the present instance, which are designated from front to back, respectively, by the numerals 251, 252, and 253. Each of these latching levers extends both above and below its pivot and springs 254, one connected to each lever, tend to pull the bottom ends of these levers leftwardly and move the top ends rightwardly when viewed as in Fig. 18.

Each lever has near its upper left corner an upper extension 255 which may contact with a shaft 256 extending to the front of the casing and provided with an external knob 257, as shown in Figs. 23 and 25. This knob 257 serves as means for rotating the shaft 256 from the exterior of the casing and is provided with graduations, as shown in Fig. 25, which cooperate with a suitable index mark 258 on the casing to indicate the relative position of the knob. A portion of the knob 257 may have a plurality of notches 259 cooperating with a spring pressed detent 260, as shown in Figs. 23 and 26, for frictionally holding the knob in any one of the plurality of positions indicated by the graduations.

In the plane of each of the levers 251, 252, and 253, the shaft 256 has a notch, all the notches being in different relative positions around the shaft. When the shaft 256 is rotated to a predetermined position, one of the notches is brought into cooperation with one of the tails 255 so that this tail may move into the notch, as shown in Fig. 20, and its associated lever may move slightly in a clockwise direction under the influence of its spring 254. At this time, however, all of the other notches will be out of cooperation with the tails 255 on the other levers, so that these tails will all be in contact with the periphery of the shaft 256, and the corresponding levers will be held in a position with their tops slightly leftwardly of the top of the lever which is engaged with the notch. By rotating the shaft 256 to some other position, the tail 255 of the lever in the notch will be forced out of the notch and made to ride on the periphery of the shaft, while another notch may be brought into cooperation with another one of the levers, all as will be explained in greater detail hereafter.

The sleeve 226 which carries the pawl carrying arm 227 has a substantially radial fin 265 (Figs. 20 and 21) having on its bottom a hardened wear plate 266. At each complete oscillation of the arm 227 caused by rotation of the crank 236, the fin 265 is oscillated to a position slightly above the upper right hand corner of the latching levers 251, 252, and 253. When all of the levers are out of the notches in the shaft 256 and engaged with the periphery of this shaft, the upper right hand corners of all these levers are withdrawn so that the fin 265 does not come into contact with them. Whenever the shaft 256 is turned, however, so that one of the levers may enter a notch in the shaft, then the upper end of this lever is slightly farther to the right and the upper right hand corner of the lever is in the path of the fin 265. As the fin oscillates upwardly, under the influence of the crank 236, it will come into contact with this latching lever, momentarily force it back against the action of its spring 254, and slip over the corner of the lever toward the upper end of the oscillation. Then as the crank 236 continues its rotation and the oscillating arm 227 begins its return, the wear plate 266 on the fin 265 will come into contact with the top of the latching lever in substantially the position illustrated in Fig. 20, and the fin will thus be held in this position, maintaining the arm 227 in the position illustrated in Fig. 19 and preventing return movement thereof. Hence the next revolution of the crank 236 will not cause another feeding movement of the conveyor, but will simply contact with the arm 227 and cause a slight ineffective oscillation thereof to lift it a short distance to the upper limit of its stroke and let it fall back only until it is caught once more by the latching lever unless this lever has meanwhile been withdrawn to an unlatching position. In this way, the latching lever is effective to prevent further movement of the conveyor at each rotation of the crank until the latching lever is withdrawn, and it is apparent that a plurality of exposures of the same article will be made by the camera, the number of exposures being equal to the number of rotations of the crank 236 which take place before the latching lever is unlatched.

Figure 22:
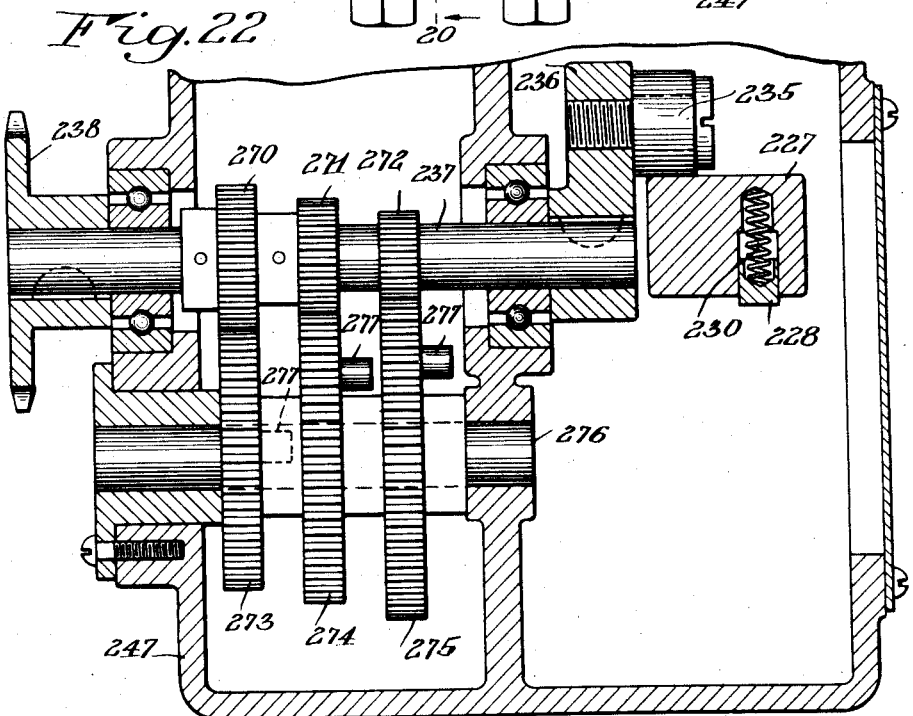
Fig. 22 is a sectional view taken substantially on the line 22—22 of Fig. 18.

For unlatching the latching levers at the desired time so that feeding of the conveyor may be continued after the desired number of exposures have been made, the crank shaft 237 is provided with a series of gears 270, 271, and 272, as seen in Figs. 22 and 24. These gears are all of different sizes, but each is fixed to the shaft 237 to rotate therewith. These gears mesh respectively with gears 273, 274 and 275, each rotatably mounted on a short shaft 276 (Figs. 22 and 23) and each of the gears of this latter set carries a lateral pin 277 in the plane of one of the latching levers for contact with the tail of the lever to unlatch it.

The gear 273 is twice the diameter of the gear 270, so that it will make one revolution for every two revolutions of the crank shaft 227. The gear 274 is three times the diameter of the gear 271 which drives it so that it will make one complete revolution for every three revolutions of the crank shaft. Similarly, the gear 275 is four times the diameter of its driving gear 272 so that it will rotate once for every four revolutions of the crank shaft.

The pin 277 on the gear 273 is arranged to trip the latching lever 253, which will thus be tripped once for every two revolutions of the crank shaft 237. Similarly, the pin 277 on the gear 274 trips the latching lever 252 once for every three revolutions of the crank shaft, while the pin 277 on the gear 275 trips the latching lever 251 once for every four revolutions of the crank shaft.

The notches in the shaft 256 are so placed on the shaft with relation to the graduations shown in Fig. 25 that when the numeral 1 of these graduations is set opposite the index 258, all of the latching levers are riding on the periphery of the shaft 256 in an ineffective position. If the knob 257 be rotated to bring the numeral 2 opposite the index 258, then the lever 253 may enter its notch in the shaft 256 but the other latching levers are still held in an ineffective position on the periphery. Consequently, the first revolution of the crank 236 will oscillate the arm 227 in a clockwise direction to feed the conveyor, but this arm will be latched in an upper position near the end of its forward stroke, as shown in Fig. 19, so that the crank 236 will continue its rotation without a corresponding return movement of the arm 227. Hence, the second revolution of the crank will not cause any feeding of the conveyor because it will not cause any effective oscillation of the arm 227. During the latter part of the second revolution of the crank, however, the pin 277 on the gear 273, which is rotated once for every two revolutions of the crank, will come into contact with the downwardly extending tail of the latching lever 253 and will momentarily move this latching lever to withdraw the upper right hand corner thereof from the fin 265, so that the arm 227 may complete its oscillation and return to the initial position illustrated in Fig. 18. Then the next rotation of the crank 236 will cause one more feeding operation of the conveyor, after which the arm 227 will again be latched by the latching lever, and so on. In this way, two exposures of the same article will be made between successive feeding movements of the conveyor.

If the control knob 257 be turned so that the numeral 3 of the graduations is opposite the index 258, then the latching lever 253 is withdrawn from its notch and rides on the periphery of the shaft 256, while the latching lever 252 is permitted to move into its notch, which brings the upper right hand corner of this lever into effective position to latch the fin 265. The first revolution of the crank will then cause a feeding movement of the conveyor but the arm 227 will be latched by the lever 252 so that the second and third revolutions of the crank will not cause effective oscillation of the arm, and consequently will not produce any feeding of the conveyor. Toward the end of the third revolution, however, the pin 277 on the gear 274 will trip the lever 252, permitting the arm 227 to return to initial position, so that the next revolution of the crank will once more cause a feeding movement of the conveyor, after which the arm will once more be latched in an ineffective position. In this way, three exposures of each article will be made by the camera between successive feeding movements of the conveyor.

Similarly, if the numeral 4 of the graduations be brought opposite the index 258, which is the position shown in Fig. 25, then the latching levers 252 and 253 will be withdrawn from their notches in the shaft 256 but the latching lever 251 will be permitted to move into its notch. The operation will be similar to that above described, except that the pin 277 on the gear 275 will not trip the latching lever 251 until the latter part of the fourth revolution of the crank. In this way, four exposures will be made of each article.

Figure 27:
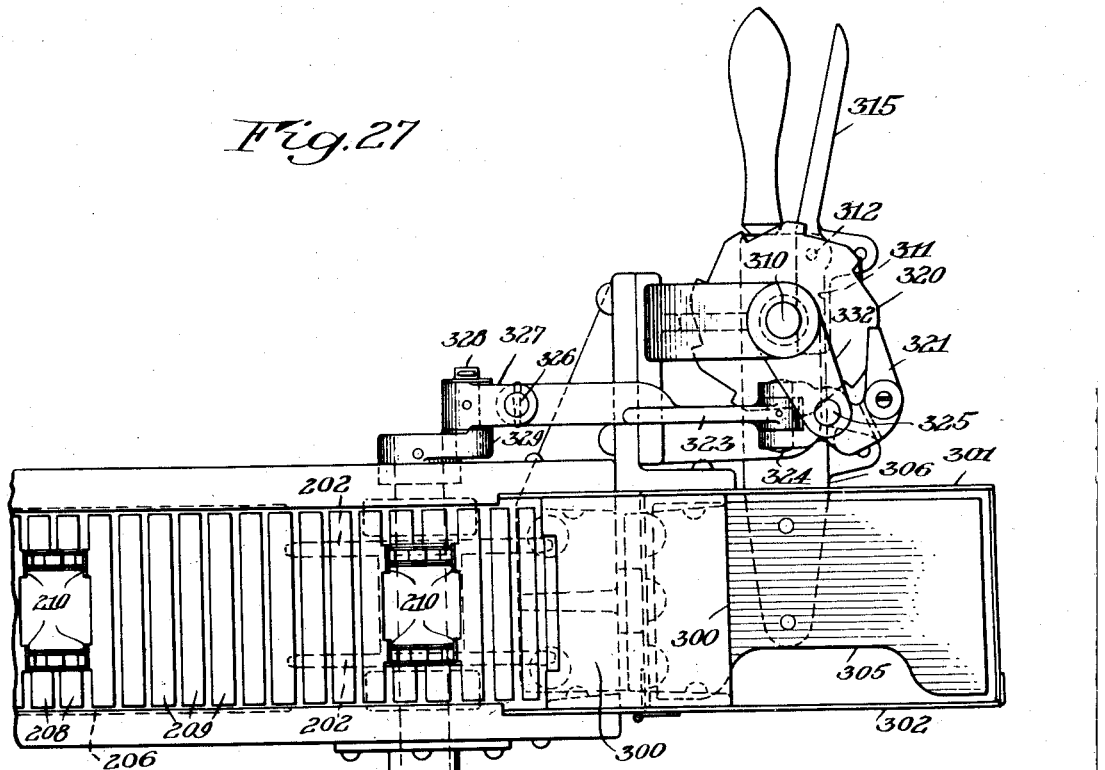
Fig. 27 is a plan of a portion of the copy conveyor near the right hand end of the machine and its associated stacking mechanism.
Figure 28:
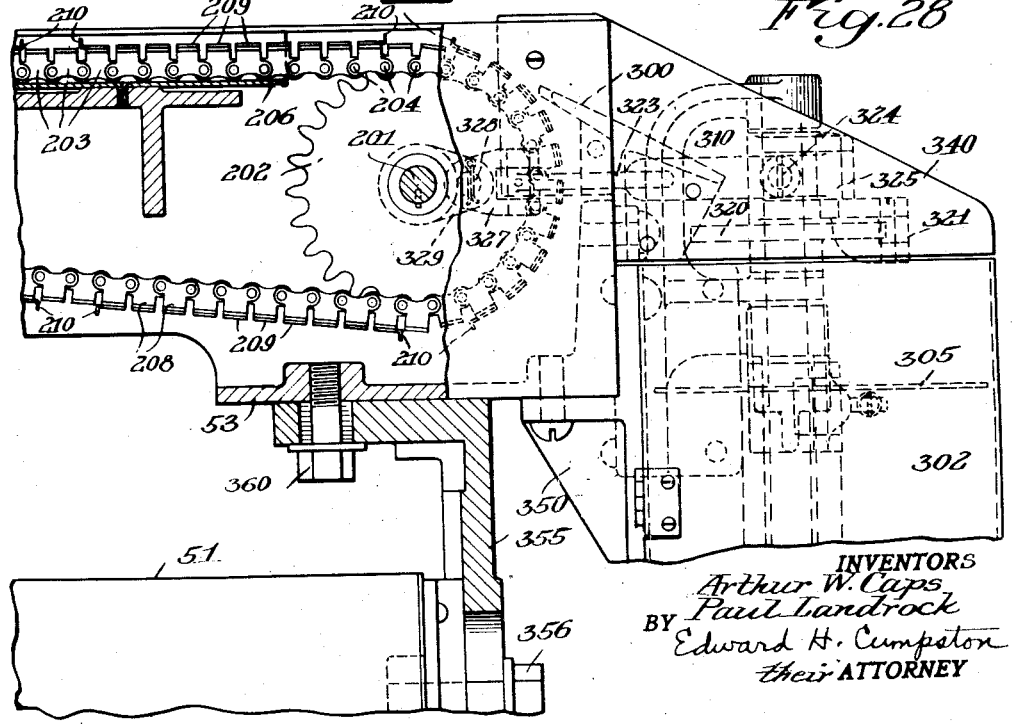
Fig. 28 is a front elevation of the parts shown in Fig. 27 with parts in vertical section.

After the requisite number of exposures of each article have been made, continued feeding movement of the conveyor finally brings each article to a position over the shaft 201 at the right hand end of the conveyor, and as the conveyor begins to pass around the sprockets on this shaft, the article slides off onto a guide plate 300 (Figs. 27 and 28) and slides down this plate and into any suitable receptacle 301. When the articles being photographed are cards, the receptacle 301 is made of proper size to receive these cards loosely, but to confine them sufficiently so that they fall one upon another and will be automatically stacked. The receptacle 301 is provided with a door 302 at the front through which a stack of accumulated cards can be removed.

It is found that if the top of the pile of cards is a substantial distance below the guide plate 300, then the cards do not stack as evenly as if the top of the stack is a relatively short distance below the guide plate. When the card is permitted to fall through a considerable distance, it may twist during such fall so that it may even fall upside down onto the pile or stack of cards. To prevent this, and to insure better and more uniform stacking of the discharged articles, the present invention contemplates the provision of a support for the stack which moves automatically approximately in accordance with the accumulation of articles on the stack, so that the capacity of the receiving stack is great and yet the articles have to fall only a short distance onto the top of the stack.

To this end, the article receiving casing 301 is provided with a bottom or support 305 which is vertically movable, being mounted on a bracket 306 extending into the casing through a slot in the rear wall thereof, which bracket 306 is formed as part of a sleeve 307 (Fig. 29) freely movable vertically on a guide shaft 308. During normal operation of the device, the bottom or support 305 is automatically moved downwardly by a screw 310 with which engages a half nut 311 (Figs. 29 and 31) pivoted at 312 to an extension 313 on the sleeve 307. A spring 314 normally holds the half nut 311 in threaded engagement with the threads of the screw 310. By grasping a handle portion 315 fixed to this half nut, however, it may be moved against the influence of the spring 314 to release it from the threads of the screw 310 so that the support 305 and associated parts may be freely moved up or down, as desired.

Fixed to the screw 310 near its upper end is a ratchet 320 (Figs. 27 and 2) arranged to be engaged and operated by a pawl 321 on an arm 322 mounted for oscillation about the axis of the screw 310. This arm 322 is connected to an operating link 323 by a universal joint having pivots 324 and 325 at right angles to each other, and the opposite end of the link 323 is pivoted at 326 to a block 327 mounted on the crank pin 328 of a crank 329 fixed to the conveyor shaft 201. Each time that the conveyor is driven forwardly the shaft 201 will rotate through at least part of a revolution, which will cause corresponding rotation of the crank 329 and, through the link 323, corresponding movement of the pawl 321. The action of the pawl upon the ratchet 320 will gradually rotate the screw 310 in a direction to lower the support 305, and the proportions of the parts are so chosen that the support 305 will move downwardly approximately at the same rate at which the pile or stack of the discharged articles is built up. Hence at the beginning of the operation the support 305 can be placed in a relatively high position so that the cards or other articles photographed will not fall far after sliding off the guide plate 300. Yet the capacity of the stack is not limited by the nearness of the support 305 to the guide plate 300, because as articles accumulate on the stack, the stack as a whole moves downwardly under the influence of the screw 310 and the top of the stack is, therefore, always maintained at approximately the same elevation relative to the guide plate 300, off of which the articles slide.

The screw threads of the screw 310 are cut away near the bottom of the screw, as indicated at 335 in Fig. 29, so that when the support reaches the bottom limit of its movement, no damage to the parts will occur if the operator does not notice this condition. Downward movement of the support 305 will simply stop, and the top of the pile will be built up higher and higher as additional articles are deposited thereon, without any damage whatever to the apparatus.

Above the container 301 is a separate upward extension comprising front and back plates 340 (Figs. 28 and 29) connected to each other by an end plate 341, which is held to the main casing by screws 342 passing through slots in the plate. The guide plate 300 is secured to and supported by these plates 340, and since these plates are separate from the main body of the container 301, they may be easily adjusted simply by loosening the screws 342 whenever it is desired to adjust the guide plate 300 relative to the conveyor.

The container 301 for receiving the articles discharged from the conveyor is carried by a bracket 350 (Fig. 1) from the main conveyor casing 53, while the casing 247 at the left hand end of the conveyor which houses the conveyor operating mechanism, is likewise carried by the main conveyor casing 53. Hence, all of the conveyor mechanism and closely associated parts form a single unit which is bodily movable together. This whole unit or assembly is adjustably mounted relative to the main casing parts 50 and 51, for focusing the camera. Preferably, the conveyor casing 53 is carried by vertical brackets 355 (Fig. 1) secured to the ends of the casing 51 by bolts 356 passing through slots in the brackets so that when the bolts are loosened, the brackets may be adjusted upwardly or downwardly by adjusting screws 357. These brackets 355, in turn, are secured to the conveyor casing 53 by lag screws 360 (Figs. 1 and 28) which pass through relatively large holes in the brackets and screw into the conveyor casing. Hence when these screws 360 are loosened, the conveyor casing may be adjusted through a limited extent forward or backward or sideways as may be desired, due to the size of the holes through which the screws 360 pass. Adjusting screws 361 (Figs. 1 and 3) may be provided for assisting the forward and backward adjustment of the conveyor.

In focusing the camera either initially at the factory or when setting up the mechanism at a place where it is to be used, the roll box 56 is removed through the rear door 57, as previously explained, so that the operator may see the image upon the ground glass plate 63. By means of the adjustments described immediately above, the conveyor and its driving mechanism and stacking mechanism can all be adjusted together as a unit, vertical adjustment being made, if necessary, to bring the articles on the conveyor accurately into proper focus, while horizontal adjustment may be made so that when the conveyor is in its position of rest, an article held by the guiding lugs 210 will be accurately centered in the photographic field of the camera, all as may be ascertained by noting the image on the ground glass plate. If, when the conveyor is at rest, the guiding lugs 210 are not in the proper position in the photographic field of the camera, this may be corrected and their positions of rest may be properly correlated with the rest of the mechanism, by sliding the gears 221 and 222 longitudinally on their shaft or stud until they are disengaged from the gears 220 and 223, and then moving either the gear 220 or the gear 223 through the proper amount relative to the other, after which the gears 221 and 222 may be reengaged.

In operation, after the camera has been properly focused, the roll box 56 containing a roll 59 of sensitized material, is placed in the camera through the door 57, which may then be closed. The top door 67 is then opened, and the strip P of sensitized material is led from the roll 59 forwardly, over the guide roll 60, and shoved downwardly through the space between the focal plane support 63 (the glass plate) and the retaining plate 65.

The release lever 80 for the feed rollers is then oscillated to separate the rollers 72 and 73 slightly from each other, after which the strip of sensitized material is shoved on downwardly between these rollers and pulled downwardly and connected to the rewinding reel 85 in a manner familiar to those skilled in the art. The handle 80 is then returned to its normal position, permitting the roller 73 to be pulled toward the roller 72 by the action of the spring 78 so that the feeding rollers effectively grip the sensitized material and will be operative to feed it upon rotation of the rollers. The various doors of the camera casing are then closed.

The operator grasps the handle 315 carrying the threaded half nut so as to disengage it from the screw 310 and lifts upwardly to bring the support 305 for the discharged photographed articles to the upper limit of its motion. The handle 315 is then released so that the spring 314 engages the threads of the member 311 with the threads of the screw 310.

The camera is now ready for the actual taking of exposures. The motor and the illuminating lamps are turned on, and the operator, standing in front of and facing the machine, a little to the left of the camera lens, deposits the cards or other articles to be photographed on the conveyor, one at a time, placing them accurately between the holding lugs 210 so that they are positioned in predetermined relation to the conveyor.

It will be recalled that the conveyor is driven intermittently. During one of its periods of rest one of the articles will be properly positioned immediately below the camera prism in the photographic field of the camera. At this time the cam 124 (Fig. 4) on the shaft 149 rotates to such a position that the follower roller 125 is forced downwardly, depressing the lever 121 and the plunger 120, and permitting the shutter 116 to drop by gravity to the open position shown in Fig. 4. Continued rotation of the shaft 149 brings the low point of the cam 124 over the follower roller 125, so that the spring 123 moves the lever 121 and the plunger 120 upwardly, thus shifting the shutter 116 from its open position to the closed position shown in Fig. 5, which completely obstructs the light which would otherwise pass through the aperture 68 in the masking plate 65 and reach the sensitized material.

After the shutter is completely closed the rotation of the cam 150 (Figs. 3 and 10) is effective to lift up the follower roller 170 and cause a counter-clockwise oscillation of the feeding lever 172, which produces a corresponding counter-clockwise movement of the shaft 173. Through the one way clutch 179 this movement is transmitted to the gear 180, while through the gear 190 meshing therewith it causes a rotation of the feeding rollers 72 and 73, which is effective to feed the sensitized sheet material so as to remove the exposed portion from the exposure area of the focal plane, and draw a fresh unexposed portion of the material into the exposure area ready for the next exposure.

While this feeding of the sensitized material is taking place, and assuming that the mechanism is set for taking only one exposure of each article, the crank 236 (Fig. 18) turns in a counter-clockwise direction from the position shown in Fig. 18 and the roller 235 on this crank rides along and presses upon the under side of the arm 227 to cause a clockwise oscillation of this arm, so that the pawl 228 on the arm engages the teeth of the ratchet 235 and rotates the ratchet through a distance of one tooth. This rotation of the ratchet, through the gears 223, 222, 221, and 220, advances the conveyor one step so that the article which has just been photographed is removed from the photographic field of the camera, and the next article, which had previously been placed on the conveyor by the operator, is brought into the photographic field.

This feeding movement of the conveyor is completed in a little less than half a revolution of the crank 236, since it is only a clockwise oscillation of the arm 227 which causes movement of the conveyor. The return or counter-clockwise oscillation of the arm to its initial position causes no movement of the conveyor.

At the completion of the conveyor movement and feeding of the sensitized material, the cam 124 once more opens the shutter so that another exposure is made. Then when the shutter closes, the sensitized material is once more fed downwardly and the exposed portion is gradually accumulated on the rewinding reel 85. Likewise the conveyor once more moves forwardly to carry the photographed article out of the field of the camera and to bring another article into the field.

If it is desired, however, to take more than one exposure of each article, the control knob 257 (Figs. 23 and 25) is accordingly adjusted for either two, three, or four exposures of each article, with the result that the duplicating mechanism comes into play and the conveyor is moved forward only one step for every two, three, or four exposures, as the case may be, instead of one step for each exposure. The operation of this duplicating mechanism has been so completely described in connection with the description of the parts of the duplicating mechanism that it is believed to be unnecessary to repeat it at this point.

After the articles have been photographed, continued movement of the conveyor brings the articles successively to the right hand end of the conveyor, from which they slide off onto the guide plate 300 and thence onto the support 305, on which the articles gradually accumulate in the form of a stack. As the stack grows in height, the bottom or support 305 automatically moves downwardly because of the rotation of the screw 310 caused by the action of the pawl 321 on the ratchet 320. Thus the top of the stack is maintained at approximately the same elevation, so that the cards or other articles have only a relatively short distance to fall and do not become overturned or twisted during their fall.

When the support 305 for the photographed articles has moved to the bottom of the container 301, the front door 302 on this container may be opened and the stack of photographed articles may be removed, the support 305 then being shifted upwardly to its initial position ready for another trip downwardly.

When the supply of sensitized material on the roll 59 is exhausted, a fresh roll is placed in the roll box 56 and the sensitized material is once more threaded across the focal plane support, between the feeding rollers, and to a fresh rewinding reel 85. The full rewinding reel on which the exposed sensitized material has accumulated is removed from the apparatus by pulling outwardly on the handle 92 (Fig. 2) to release the reel from its supporting bearings, after which the exposed material may be developed or otherwise treated in any desired or suitable manner.

Certain features disclosed but not claimed per se herein are claimed in applications filed November 22, 1932, Serial No. 643,872, and December 15, 1932, Serial No. 647,430, which applications are divisions of this present application.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. Photographic apparatus comprising a camera having a shutter, a movable conveyor including an elongated flexible belt-like element movable repeatedly through an endless path of travel, one portion of which path provides a substantially horizontal flat receiving bed on which pieces of sheet material to be copied may be successively laid, means for moving said conveyor intermittently across the photographic field of said camera, guide means on said conveyor element for defining successive areas which will be properly placed in said photographic field when said conveyor stops between its intermittent movements, and mechanism for operating said shutter in timed relation to the intermittent movements of said conveyor.

2. Photographic apparatus comprising a camera having a shutter, a movable conveyor including a flexible belt-like element movable repeatedly through an endless path of travel, one portion of which path provides a substantially horizontal flat receiving bed on which articles to be copied may be laid, a series of individual article holding guide means mounted on and movable bodily with said conveyor, means for moving said conveyor intermittently and for intermittently bringing it to rest so that successive articles held by said guide means will be successively placed in the photographic field of said camera in position to be photographed, and mechanism for operating said camera shutter in timed relation to the intermittent movements of said conveyor.

3. Photographic apparatus comprising a camera, a pair of endless chains, ears secured to links of said chains, cross members each secured to an ear on one chain and an ear on the other chain, said cross members forming a bed for receiving articles to be photographed, and means for driving said endless chains to carry articles to be photographed into the photographic field of said camera.

4. Photographic apparatus comprising a camera, a pair of endless chains, ears secured to links of said chains, cross members each secured to an ear on one chain and an ear on the other chain, said cross members forming a bed for receiving articles to be photographed, upstanding lugs on certain of said cross members for holding articles to be photographed in predetermined position on said bed, and means for driving said endless chains to carry said articles into the photographic field of said camera.

5. Photographic apparatus comprising a camera, a copy conveyor for moving articles with relation to the photographic field of said camera, movable operating means, mechanism for driving said conveyor from said operating means, a plurality of different holding means for rendering said driving mechanism temporarily ineffective to drive said conveyor notwithstanding continued movement of said operating means, and means for rendering each of said holding means ineffective after a different extent of movement of said operating means.

6. Photographic apparatus comprising a camera, a copy conveyor for moving articles with relation to the photographic field of said camera, rotatable crank means, mechanism including an arm engageable by said crank means for driving said conveyor, a plurality of different means for holding said arm in an ineffective position relative to said crank means during a predetermined number of rotations thereof, and means for rendering any selected one of said different holding means effective or ineffective at will.

7. Photographic apparatus comprising a camera, a copy conveyor for moving articles with relation to the photographic field of said camera, a driving arm for operating said conveyor, operating means for acting upon said driving arm to operate said conveyor, a plurality of different latching means for holding said driving arm out of cooperative relation to said operating means, and means for rendering any selected one of said different latching means effective or ineffective at will.

8. Photographic apparatus comprising a camera, a copy conveyor for moving articles with relation to the photographic field of said camera, operating means, driving mechanism operatively connecting said operating means to said conveyor, and a plurality of selectively operable means for rendering said driving mechanism ineffective during different predetermined extents of movement of said operating means.

9. Photographic apparatus comprising a camera, a conveyor for removing photographed articles from the photographic field of said camera, said conveyor including a flexible belt-like element movable repeatedly through an endless path of travel, one portion of which path of travel provides a substantially horizontal flat receiving bed on which articles to be copied may be laid, an inclined member onto which articles are delivered by said conveyor and down which they slide by gravity, a supporting member onto which articles fall freely by gravity from said inclined member, and means driven in timed relation to said conveyor for lowering said supporting member approximately in accordance with the increasing height of articles accumulating on said supporting member, so that each article has approximately the same distance to fall.

10. Photographic apparatus comprising a camera having a shutter, a conveyor for removing photographed articles from the photographic field of said camera, said conveyor including a flexible belt-like element movable repeatedly through an endless path of travel, one portion of which path of travel provides a substantially horizontal flat receiving bed on which articles to be copied may be laid, an inclined member onto which articles are delivered by said conveyor and down which they slide by gravity, a supporting member onto which articles fall freely by gravity from said inclined member, mechanism for driving said conveyor intermittently to carry an article laid thereon into the photographic field of the camera and then to deliver it to said inclined member, mechanism for operating said camera shutter in timed relation to the intermittent movements of said conveyor, and means driven in timed relation to said conveyor for lowering said supporting member approximately in accordance with the increasing height of articles accumulating on said supporting member, so that each article has approximately the same distance to fall.

ARTHUR W. CAPS.
PAUL LANDROCK.